(12) United States Patent
Albritton

(10) Patent No.: US 6,536,985 B2
(45) Date of Patent: Mar. 25, 2003

(54) ENERGY ABSORBING SYSTEM FOR FIXED ROADSIDE HAZARDS

(75) Inventor: James R. Albritton, Aledo, TX (US)

(73) Assignee: Exodyne Technologies, Inc., Fort Worth, TX (US)

( * ) Notice: Subject to any disclaimer, the term of this patent is extended or adjusted under 35 U.S.C. 154(b) by 0 days.

(21) Appl. No.: 09/832,162

(22) Filed: Apr. 9, 2001

(65) Prior Publication Data

US 2002/0090260 A9 Jul. 11, 2002

Related U.S. Application Data

(60) Division of application No. 09/356,060, filed on Jul. 19, 1999, now Pat. No. 6,293,727, and a continuation-in-part of application No. 08/870,118, filed on Jun. 5, 1997, now Pat. No. 5,947,452.
(60) Provisional application No. 60/096,538, filed on Aug. 13, 1998.

(51) Int. Cl.$^7$ .................................... E01F 15/00
(52) U.S. Cl. ...................... 404/6; 404/10; 256/13.1
(58) Field of Search .................... 404/6, 9, 10; 256/13.1

(56) References Cited

U.S. PATENT DOCUMENTS

| | | | |
|---|---|---|---|
| 2,837,176 A | 6/1958 | Dropkin | 188/1 |
| 2,845,144 A | 7/1958 | Bohn | 188/1 |
| 3,428,150 A | 2/1969 | Muspratt | 188/1 |
| 3,779,591 A | 12/1973 | Rands | |
| 3,782,505 A | 1/1974 | Armstrong | 188/1 |
| 3,944,187 A | 3/1976 | Walker | 256/13.1 |
| 3,982,734 A | 9/1976 | Walker | 256/13.1 |
| 4,008,915 A | 2/1977 | Walker | 293/60 |
| 4,200,310 A | 4/1980 | Carney, III | 280/784 |
| 4,321,989 A | 3/1982 | Meinzer | 188/377 |

(List continued on next page.)

FOREIGN PATENT DOCUMENTS

| | | | |
|---|---|---|---|
| EP | 0 042 645 A2 | 12/1981 | E01F/15/00 |
| EP | 0 286 782 A1 | 10/1988 | E01F/15/00 |
| WO | WO 97/47495 | 12/1997 | B60R/19/34 |
| WO | WO 00/68594 | 11/2000 | F16F/7/00 |

OTHER PUBLICATIONS

International Search Report for PCT/US 99/18509, Jan. 12, 2000.
"Trinity Attenuating Crash Cushion (TRACC)—Installation and Repair Manual", an NCHRP Report 350 Crash Cushion. 21 pages, Jan. 1, 2001.
U.S. patent application Publication No. US 2001/0013596 dated Aug. 16, 2001 for U.S. patent application Ser. No. 09/410,635 filed Oct. 1, 1999 by Dean L. Sicking et al.
U.S. patent application Publication No. US 2002/0007994 dated Jan. 24, 2002 for U.S. patent application Ser. No. 09/935,949 filed Aug. 23, 2001 by John D. Reid et al.

(List continued on next page.)

Primary Examiner—Gary S. Hartmann
(74) Attorney, Agent, or Firm—Baker Botts L.L.P.

(57) ABSTRACT

An energy absorbing system with one or more energy absorbing assemblies is provided to reduce or eliminate the severity of a collision between a moving motor vehicle and a roadside hazard. The energy absorbing system may be installed adjacent to a roadside hazard such as the end of a concrete barrier facing oncoming traffic. The energy absorbing system preferably includes at least one energy absorbing element. A sled assembly is also provided with a cutter plate such that a collision by the motor vehicle with one end of the sled assembly will result in the cutter plate tearing or ripping the energy absorbing element to dissipate energy from the motor vehicle collision. The configuration and number of energy absorbing assemblies and the configuration and number of energy absorbing elements may be varied depending upon the intended application for the resulting energy absorbing system.

11 Claims, 10 Drawing Sheets

U.S. PATENT DOCUMENTS

| | | | |
|---|---|---|---|
| 4,352,484 A | 10/1982 | Gertz et al. | 256/13.1 |
| 4,399,980 A | 8/1983 | Van Schie | 256/13.1 |
| 4,407,484 A * | 10/1983 | Meinzer | 104/256 |
| 4,452,431 A * | 6/1984 | Stephens et al. | 256/13.1 |
| 4,635,981 A | 1/1987 | Friton | 293/1 |
| 4,645,375 A | 2/1987 | Carney, III | 404/6 |
| 4,655,434 A | 4/1987 | Bronstad | 256/13.1 |
| 4,678,166 A | 7/1987 | Bronstad et al. | 256/13.1 |
| 4,711,481 A | 12/1987 | Krage et al. | 293/133 |
| 4,815,565 A | 3/1989 | Sicking et al. | 188/32 |
| 4,822,208 A | 4/1989 | Ivey | 404/6 |
| 4,823,923 A | 4/1989 | Moyer | 188/376 |
| 4,909,661 A | 3/1990 | Ivey | 404/6 |
| 4,928,928 A | 5/1990 | Buth et al. | 256/13.1 |
| 5,011,326 A | 4/1991 | Carney, III | 404/6 |
| 5,078,366 A | 1/1992 | Sicking et al. | 256/13.1 |
| 5,112,028 A | 5/1992 | Laturner | 256/13.1 |
| 5,199,755 A | 4/1993 | Gertz | 293/120 |
| 5,248,129 A | 9/1993 | Gertz | 256/13.1 |
| 5,295,757 A | 3/1994 | Ivey et al. | 404/6 |
| 5,391,016 A | 2/1995 | Ivey et al. | 404/6 |
| 5,403,112 A | 4/1995 | Carney, III | 404/6 |
| 5,407,298 A | 4/1995 | Sicking et al. | 404/6 |
| 5,503,495 A | 4/1996 | Mak et al. | 404/6 |
| 5,547,309 A | 8/1996 | Mak et al. | 404/6 |
| 5,733,062 A * | 3/1998 | Oberth et al. | 256/13.1 |
| 5,775,675 A | 7/1998 | Sicking et al. | 256/13.1 |
| 5,797,592 A | 8/1998 | Machado | 256/13.1 |
| 5,851,005 A * | 12/1998 | Muller et al. | 256/13.1 |
| 5,868,521 A * | 2/1999 | Oberth et al. | 404/6 |
| 5,868,527 A | 2/1999 | King et al. | 405/290 |
| 5,924,680 A | 7/1999 | Sicking et al. | 256/13.1 |
| 5,931,448 A | 8/1999 | Sicking et al. | 256/13.1 |
| 5,957,435 A | 9/1999 | Bronstad | 256/13.1 |
| 5,988,598 A | 11/1999 | Sicking et al. | 256/13.1 |
| 6,022,003 A | 2/2000 | Sicking et al. | 256/13.1 |
| 6,109,597 A | 8/2000 | Sicking et al. | 256/13.1 |
| 6,129,342 A | 10/2000 | Bronstad | 256/13.1 |
| 6,244,571 B1 | 6/2001 | Reid et al. | 256/13.1 |
| 6,254,063 B1 | 7/2001 | Rohde et al. | 256/13.1 |
| 6,260,827 B1 | 7/2001 | Sicking et al. | 256/13.1 |
| 6,308,809 B1 | 10/2001 | Reid et al. | 188/377 |
| 6,416,041 B1 | 7/2002 | Sicking et al. | 256/13.1 |

OTHER PUBLICATIONS

"Development of a Metal Cutting W–Beam Guardrail Terminal" (Interstate Steel has the "BEST") by Pfeifer, et al., Transp. Res. Report TRP–03–43–94, Sep. 1994.

Alpha 60 MD, "Think Fast!" brochure, by Energy Absorption Systems, Inc.

"Traiload Traffic Management Equipment" brochure, by Traiload Trailers, Ltd., UK.

Exodyne Technolgies, Inc., *Low Cost Guardrail End–Treatment*, Final Report on Contract DTRS–57–92–C–00130, A Small Business Innovation Research Project, Oct. 30, 1995.

"Renco Ren–Gard TMA (Truck Mounted Attenuator)," by Renco, Inc., 11/92, Nov. 1992.

"When Lives Are at Stake in Highway Construction Zones . . . " by Syro, a Subsidiary of Trinity Industries.

International Search Report for PCT/US97/09960, Sep. 3. 1997.

U.S. Department of Transportation Letter, Jun. 12, 1996.

U.S. Department of Transportation Letter, Oct. 30, 1996.

* cited by examiner

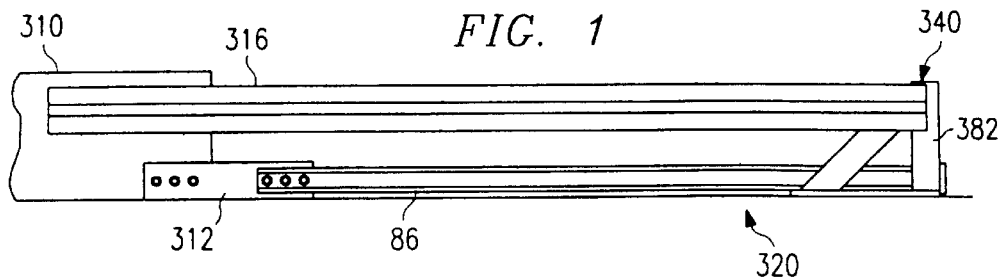
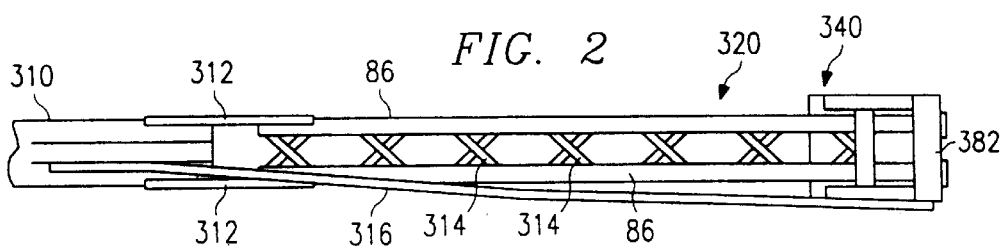
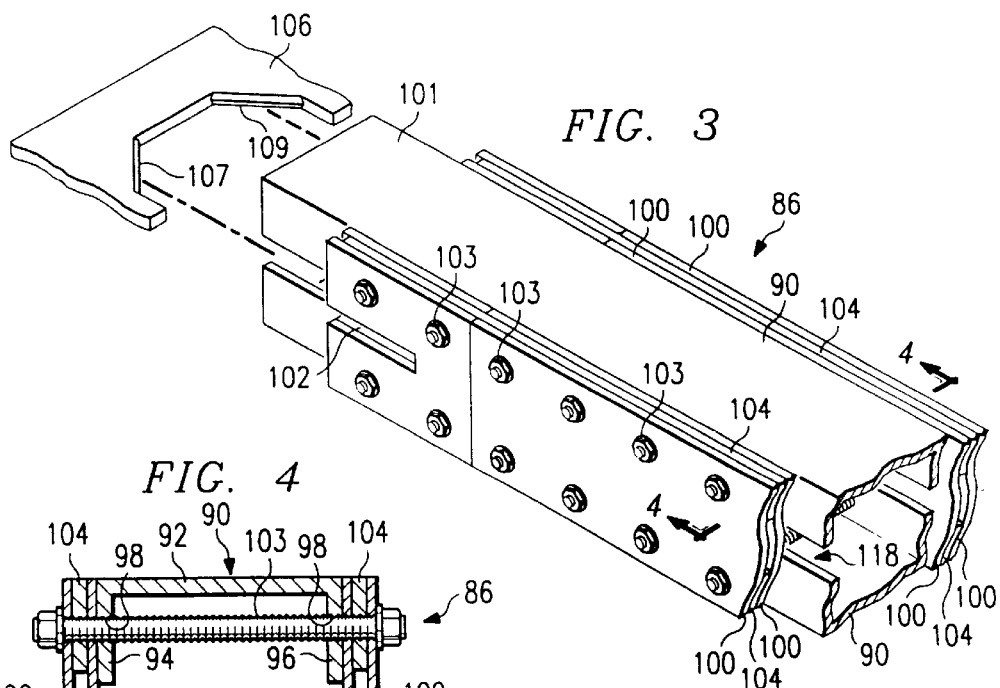
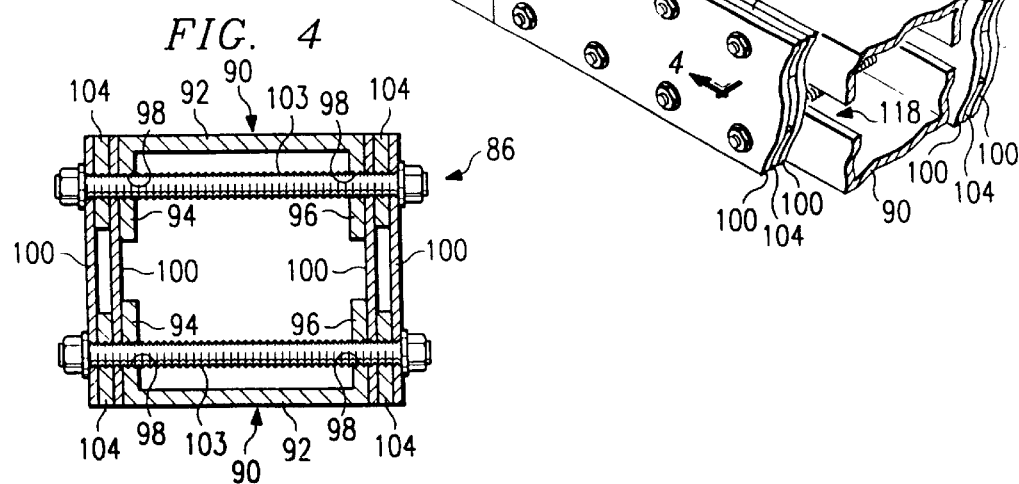

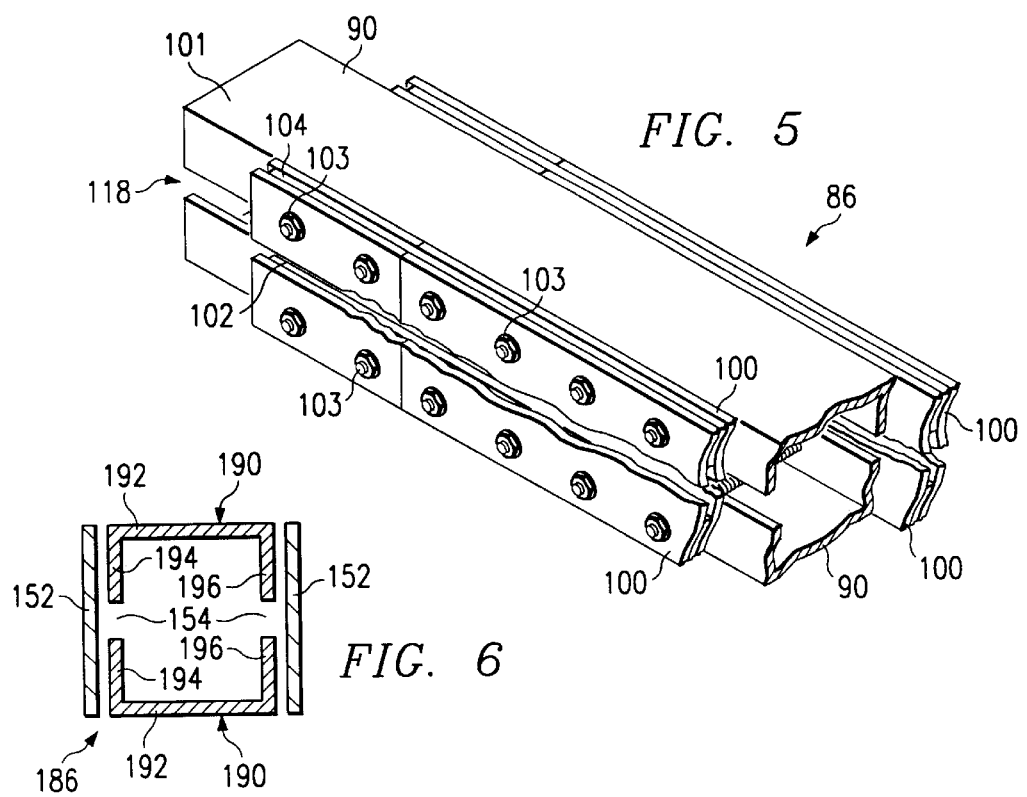
FIG. 5
FIG. 6
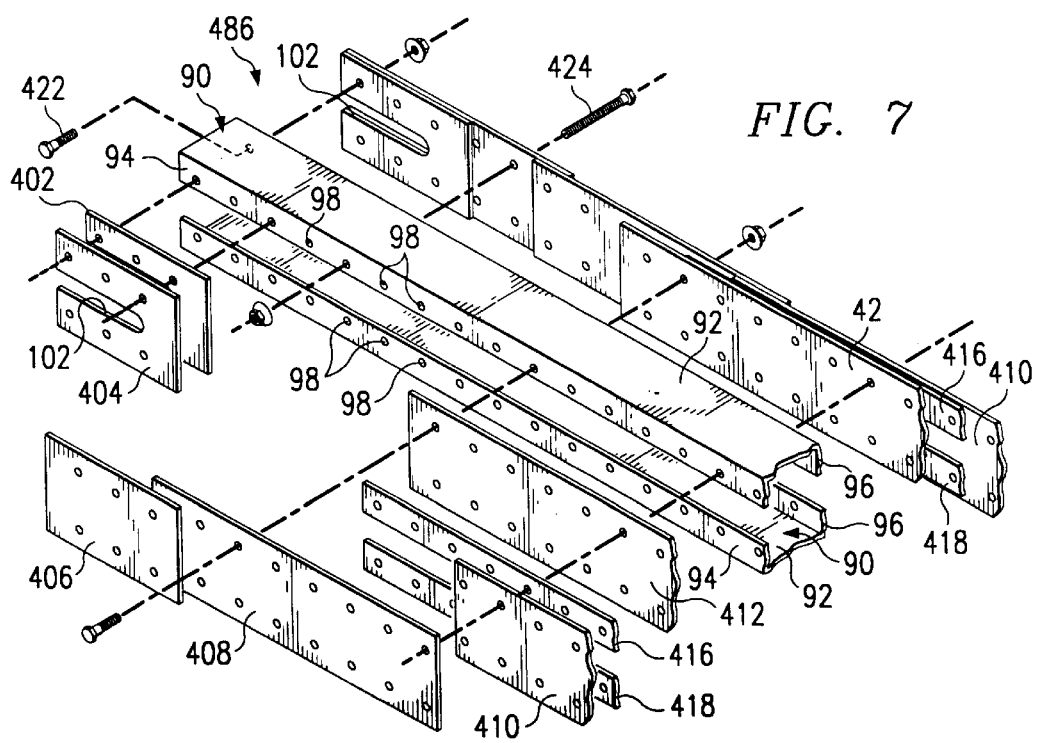
FIG. 7

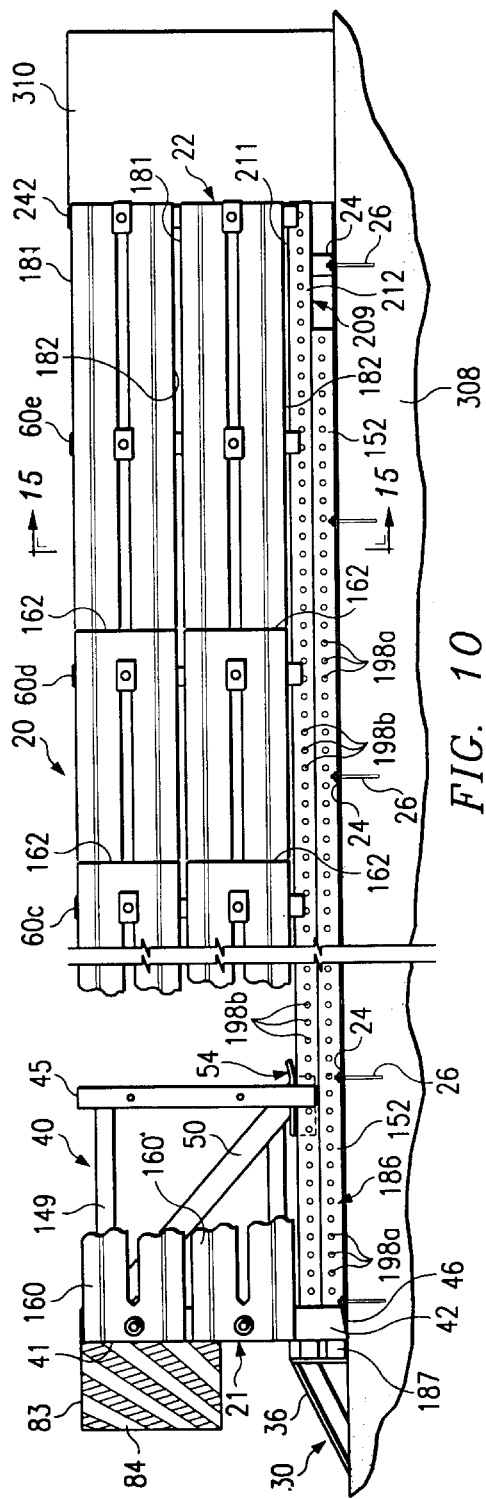
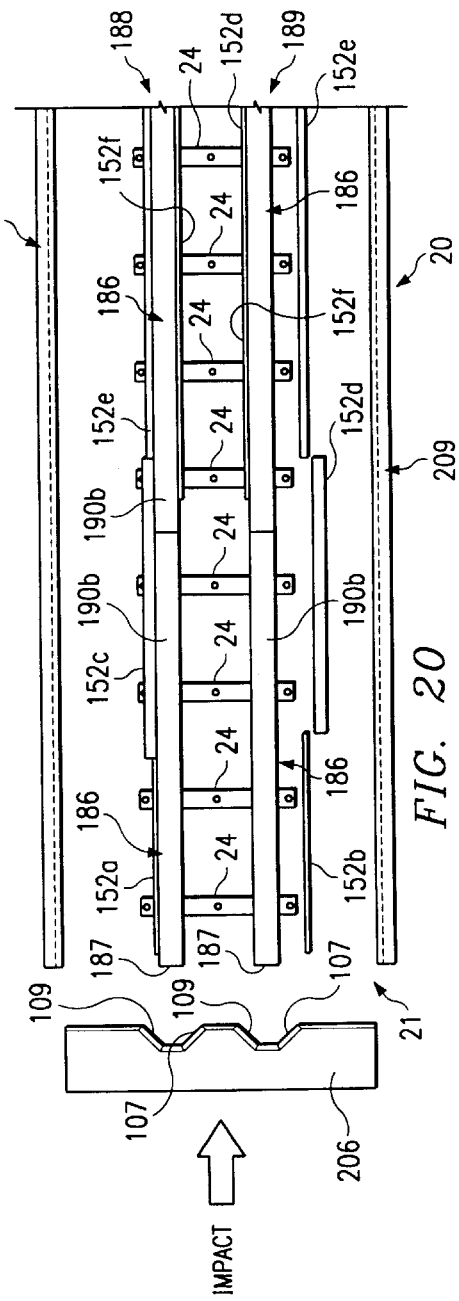

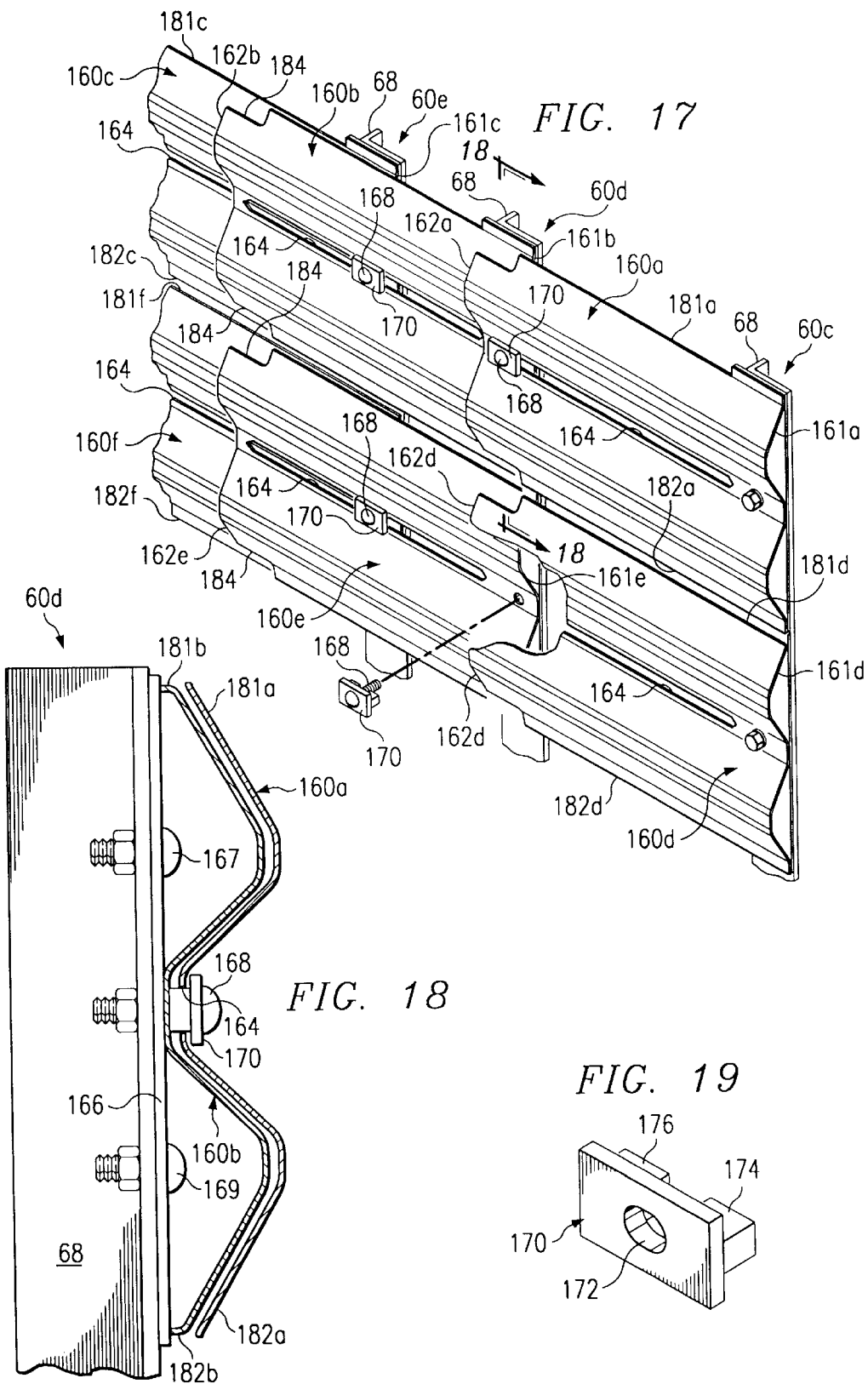

ENERGY ABSORBING SYSTEM FOR FIXED ROADSIDE HAZARDS

RELATED APPLICATIONS

This application is a divisional application of U.S. Ser. No. 09/356,060 filed Jul. 19, 1999 now U.S. Pat. No. 6,293,727, by James R. Albritton entitled Energy Absorbing System for Fixed Roadside Hazards that claims the benefit of previously filed provisional application Ser. No. 60/096,538 filed Aug. 13, 1998 entitled Energy Absorbing System for Fixied Roadside Hazards and is a continuation-in-part application of U.S. Ser. No. 08/870,118 filed Jun. 5, 1997, entitled Energy Absorbing Crash Cushion, now U.S. Pat. No. 5,947,452.

TECHNICAL FIELD OF THE INVENTION

This invention relates in general to the field of impact attenuation devices, and more particularly to an energy absorbing system which may be used to reduce the severity of a collision between a moving motor vehicle and a stationary hazard adjacent to a roadway.

BACKGROUND OF THE INVENTION

Various impact attenuation devices and energy absorbing systems have been used to prevent or reduce damage resulting from a collision between a moving motor vehicle and a fixed roadside hazard or obstacle. Examples of prior impact attenuation devices and energy absorbing systems include crash cushions or crash barriers with various structures and containers having crushable elements. Other crash barriers rely on inertia forces generated when material such as sand is accelerated during an impact to absorb energy.

Some of these devices and systems have been developed for use at narrow roadside hazards or obstacles such as at the end of a median barrier, end of a barrier extending along the edge of a roadway, large sign posts adjacent to a roadway, and bridge pillars or center piers. Such impact attenuation devices and energy absorbing systems are installed in an effort to minimize the extent of personal injury as well as damage to an impacting vehicle and any structure or equipment associated with the roadside hazard.

Examples of general purpose impact attenuation devices are shown in U.S. Pat. No. 5,011,326 entitled Narrow Stationary Impact Attenuation System; U.S. Pat. No. 4,352,484 entitled Shear Action and Compression Energy Absorber; U.S. Pat. No. 4,645,375 entitled Stationary Impact Attenuation System; and U.S. Pat. No. 3,944,187 entitled Roadway Impact Attenuator. Examples of specialized stationary energy absorbing systems are shown in U.S. Pat. No. 4,928,928 entitled Guardrail Extruder Terminal and U.S. Pat. No. 5,078,366 entitled Guardrail Extruder Terminal. Each of the preceding patents is incorporated by reference for all purposes in the present application.

Examples of impact attenuation devices and energy absorbing systems appropriate for use on a slow moving or stopped highway service vehicle are shown in U.S. Pat. No. 5,248,129 entitled Energy Absorbing Roadside Crash Barrier; U.S. Pat. No. 5,199,755 entitled Vehicle Impact Attenuating Device; U.S. Pat. No. 4,711,481 entitled Vehicle Impact Attenuating Device; U.S. Pat. No. 4,008,915 entitled Impact Barrier for Vehicles.

Recommended procedures for evaluating performance of various types of highway safety devices including crash cushions is presented in *National Cooperative Highway Research Program (NCHRP) Report* 350. A crash cushion is generally defined as a device designed to safely stop an impacting vehicle within a relatively short distance. *NCHRP Report* 350 further classifies crash cushions as either "redirective" or "nonredirective". A redirective crash cushion is designed to contain and redirect a vehicle impacting downstream from a nose or end of the crash cushion facing oncoming traffic extending from a roadside hazard. Nonredirective crash cushions are designed to contain and capture a vehicle impacting downstream from the nose of the crash cushion. Redirective crash cushions are further classified as either "gating" or "nongating" devices. A gating crash cushion is one designed to allow controlled penetration of a vehicle during impact between the nose of the crash cushion and the beginning of length of need (LON) of the crash cushion. A nongating crash cushion is designed to have redirection capabilities along its entire length.

SUMMARY OF THE INVENTION

In accordance with teachings of the present invention, disadvantages and problems associated with the previous impact attenuation devices and energy absorbing systems have been substantially reduced or eliminated. One aspect of the present invention includes providing a crash barrier or crash cushion which may be installed adjacent to a fixed roadside hazard or obstacle to protect occupants of a vehicle from collision with the roadside hazard. The crash cushion preferably includes a cutter plate and a series of rip plates or energy absorbing elements which cooperate with each other to absorb energy from a vehicle impacting one end of the crash-cushion opposite from the fixed roadside hazard. The rip plates remain relatively fixed within the crash cushion while the cutter blade moves through the rip plates to absorb energy from the vehicle impact. The crash cushion also includes improved panels and associated panel support frames to redirect a vehicle impacting with either side of the crash cushion.

Another aspect of the present invention includes providing an energy absorbing system having a plurality of panel support frames and panels which may be installed between a road side hazard and oncoming traffic. The panel support frames and panels are slidably disposed relative to each other. As a result, when a vehicle collides with one end of the energy absorbing system facing oncoming traffic, the panel support frames and panels will telescope or collapse relative to each other to cushion the impact from the vehicle. The panel support frames, associated panels and other components of the energy absorbing system cooperate with each other to absorb kinetic energy from the vehicle and provide deceleration within acceptable limits to minimize injury to occupants within the vehicle. The panel support frames and panels also cooperate with other components of the energy absorbing system to direct vehicles away from the road side hazard and back onto the roadway following a collision with either side of the energy absorbing system.

Technical advantages of the present invention include providing a crash cushion which may be fabricated at relatively low cost using conventional materials and processes that are well known to the highway safety industry. The resulting crash cushion combines innovative structural and energy absorbing techniques that are highly predictable and reliable. Energy from vehicle impact is preferably absorbed by ripping, cutting or tearing one or more energy absorbing elements. The crash cushion may be easily reused following vehicle impact by replacing one or more energy absorbing elements. A wide variety of metal strips and metal plates may be satisfactorily used as energy absorbing elements depending upon the intended operating environment for the crash cushion. Also, the number of energy absorbing elements and their geometric configuration may be varied depending upon the intended application.

In accordance with another aspect of the present invention, a crash cushion is provided with multiple energy absorbing elements disposed adjacently to one end of a fixed roadside hazard facing oncoming traffic. The energy absorbing elements cooperate with each other to allow varying the amount of deceleration applied to a vehicle impacting one end of the crash cushion opposite from the fixed roadside hazard. For example, the crash cushion may include a first, relatively soft portion to absorb impact from small, lightweight vehicles, a middle portion with increased stiffness and a third or final portion with the greatest amount of stiffness to absorb impact from heavy, high speed vehicles.

Still another aspect of the present invention includes providing a crash cushion with multiple panels which are preferably nested with each other to minimize any problems associated with a "reverse angle" impact between a vehicle and either side of the crash cushion. The panels and associated panel support frames preferably telescope with respect to each other in response to a vehicle impact at one end of the crash cushion opposite from the fixed roadside hazard. The number of panel support frames and associated panels may be selected in accordance with teachings of the present invention to optimize deceleration of an impacting vehicle while protecting occupants of the vehicle from injury due to excessive amounts of deceleration.

Further technical advantages of the present invention include providing relatively low cost crash cushions which meet the criteria of *NCHRP Report* 350 including Level 3 Requirements. A crash cushion having a cutter plate and energy absorbing elements incorporating teachings of the present invention may be satisfactorily used during harsh weather conditions and is not sensitive to cold or moisture. A cutter plate and energy absorbing elements incorporating teachings of the present invention can absorb large amounts of energy while safely stopping an impacting vehicle during a relatively short length of travel of the cutter plate through the energy absorbing elements.

The cutter plate and energy absorbing elements cooperate with each other and with panel support frames and associated panels to eliminate many of the problems associated with prior crash cushion designs. A crash cushion incorporating teachings of the present invention can satisfactorily dissipate kinetic energy of an impacting vehicle weighing 4,500 pounds at speeds of over sixty miles per hour (60 mph) with minimal damage (if any) to the roadside hazard and minimal debris (if any) from the crash cushion. A crash cushion incorporating teachings of the present invention provides highly predictable deceleration of an impacting vehicle to protect occupants of the vehicle.

In addition to eliminating problems associated with prior crash cushion designs, the present invention provides a crash cushion offering a higher level of protection to the motoring public with greater improved reliability and reduced costs. The resulting crash cushion provides appropriate deceleration or stopping force for a wide range of vehicle sizes and types including vehicles weighing between 820 kilograms and 2,000 kilograms.

A further aspect of the present invention includes a crash cushion having a sled assembly with a cutter plate attached thereto and multiple energy absorbing assemblies connected with each other by a series of cross ties or anchor plates. As a result of connecting the energy absorbing assemblies with each other, the crash cushion has a rigid frame construction which in cooperation with multiple panel supporting frames and associate panels will redirect vehicles during side impacts with the crash cushion.

For some applications each energy absorbing assembly includes two C-channels with the C shaped configurations facing each other and the C-channels extending generally horizontally in the direction of oncoming vehicle traffic during normal operation of the crash cushion. A gap of approximately one inch is provided between opposing flanges of the two C-channels. This gap may be covered by one or more metal plates or energy absorbing elements to form a closed box type structure. A cutter blade or ripper is preferably attached to the lower portion of a sled assembly at the end of the crash cushion facing oncoming traffic. During impact between a motor vehicle and the sled assembly, forces from the collision are transferred from the sled assembly to the energy absorbing assemblies by the cutter blade. As the sled assembly moves toward the fixed roadside hazard, the metal plates or energy absorbing elements which are attached on opposite sides of the C-channels are cut or ripped by the cutter blade. The energy of the impacting vehicle is dissipated and the impacting vehicle brought safely to rest by the force required to cut or rip the metal plates of the energy absorbing assemblies. Various combinations of metal plates and supporting beams may be used to form each energy absorbing assembly to provide appropriate stopping or deceleration for a wide range of vehicle types, weights and speeds of impact. Supporting beams having configurations other than C-channels may be satisfactorily used with the present invention.

Technical advantages of the present invention include providing a crash cushion which may be easily installed, operated and maintained. Easily replaceable parts allow quick, low cost repair after nuisance hits and side impacts. Elimination of easily crushed or easily bent materials further minimizes the effect of any damage from nuisance hits and/or side impacts with the crash cushion.

BRIEF DESCRIPTION OF THE DRAWINGS

A more complete understanding of the present invention may be acquired by referring to the following description taken in conjunction with the accompanying drawings in which like reference numbers indicate like features and wherein:

FIG. 1 is a schematic drawing showing an elevational view with portions broken away of an energy absorbing system incorporating teachings of the present invention installed adjacent to one end of a fixed roadside hazard;

FIG. 2 is a schematic drawing showing a plan view with portions broken away of the fixed roadside hazard and energy absorbing system of FIG. 1;

FIG. 3 is a schematic drawing showing an isometric view with portions broken away of a cutter plate and an energy absorbing assembly having a plurality of energy absorbing elements and supporting beams incorporating teachings of the present invention;

FIG. 4 is a schematic drawing in section with portions broken away taken along lines 4—4 of FIG. 3 showing the box beam type cross section of the energy absorbing assembly;

FIG. 5 is a schematic drawing showing an isometric view with portions broken away of the energy absorbing assembly of FIG. 3 after the energy absorbing elements have been cut or ripped while absorbing energy from a vehicle impact;

FIG. 6 is a schematic drawing in section with portions broken away showing an energy absorbing assembly incorporating another embodiment of the present invention;

FIG. 7 is an exploded schematic drawing showing an isometric view with portions broken of still another embodiment of the present invention in which the energy absorbing assembly includes a plurality of progressively thicker energy absorbing elements or metal plates along the length of the associated energy absorbing assembly selected to stop an impacting automobile with a gradually increasing deceleration or stopping force applied to the impacting automobile;

FIG. 10 is a more detailed schematic drawing showing an elevational view with portions broken away of the energy absorbing system shown in FIGS. 9A and 9B;

FIG. 17 is a schematic drawing showing an isometric view of overlapping panels incorporating teachings of the present invention disposed along one side of the energy absorbing system of FIG. 10;

FIG. 18 is a schematic drawing end section with portions broken away showing a first upstream panel and a second downstream panel slidably disposed relative to each other in accordance with teachings of the present invention;

FIG. 19 is a schematic drawing showing an isometric view of a slot plate satisfactory for use in slidably attaching a panel incorporating teaching of the present invention with a panel support frame; and FIG. 20 is a schematic drawing with portions broken away showing an exploded plan view of a cutter plate and energy absorbing elements satisfactory for use with the energy absorbing system of FIG. 10.

DETAILED DESCRIPTION OF THE INVENTION

Figure 8:
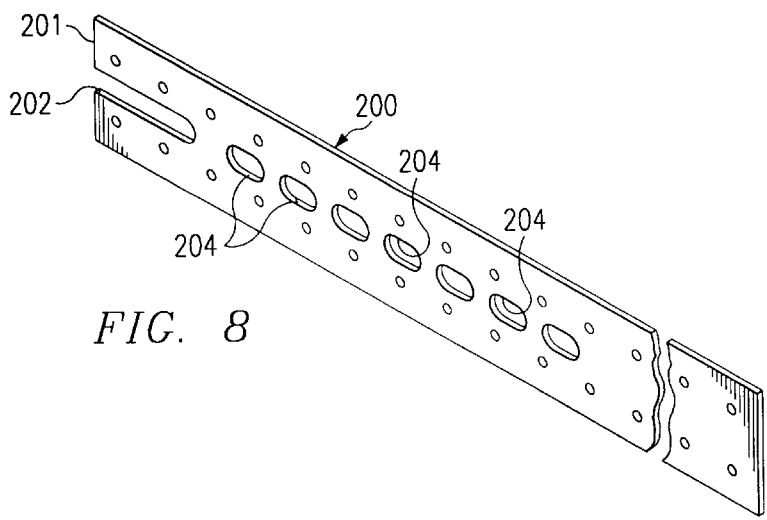
FIG. 8 is a schematic drawing showing an isometric view with portions broken away of an energy absorbing element having a plurality of cutouts disposed therein to minimize damage to a light weight motor vehicle during initial impact with an energy absorbing assembly having such energy absorbing elements.

The present invention and its advantages are best understood by referring to FIGS. 1–20 of the drawings, like numerals being used for like and corresponding parts of the drawings.

Energy absorbing system 320 incorporating one embodiment of the present invention is shown in FIGS. 1 and 2. Energy absorbing system 20 incorporating additional embodiments of the present invention is shown in FIGS. 9A–20. Energy absorbing systems 20 and 320 may sometimes be referred to as crash cushions, crash barriers, or roadside protective systems. Energy absorbing systems 20 and 320 may be used to minimize the results of a collision between a motor vehicle (not expressly shown) and various types of roadside hazards such as roadside hazard 310.

A wide variety of energy absorbing assemblies may be fabricated in accordance with the teachings of the present invention by attaching energy absorbing elements or metal plates with a pair of supporting beams spaced from each other. A cutter plate with one or more cutting edges may be disposed adjacently to the energy absorbing elements between the supporting beams to dissipate kinetic energy by ripping or tearing the associated energy absorbing elements. An energy absorbing system incorporating teachings of the present invention may be formed from energy absorbing assemblies and/or panel support frames and panels slidably disposed relative to each other. The energy absorbing assemblies, panel support frames and panels may be selected to satisfactorily absorb energy from a wide variety of vehicles colliding with the energy absorbing system at various angles including side impacts and "reverse" angle side impacts.

Energy absorbing systems 20 and 320 are shown installed at the end of roadside hazard 310 facing oncoming traffic. Roadside hazard 310 shown in FIGS. 1, 2, 9A, 9B, and 10, may be a concrete barrier extending along the edge or side of a roadway (not expressly shown). Roadside hazard 310 may also be a concrete barrier extending along the median between two roadways.

The terms "longitudinal," "longitudinally" and "linear" will generally be used to describe the orientation and/or movement of components associated with energy absorbing systems 20 and 320 in a direction which is substantially parallel with the direction vehicles (not expressly shown) will travel on an adjacent roadway. The terms "lateral" and "laterally" will generally be used to describe the orientation and/or movement of components associated with energy absorbing systems 20 and 320 in a direction which is generally normal to the direction vehicles will travel on the adjacent roadway.

The term "downstream" will generally be used to describe movement which is substantially parallel with and in the same direction as movement of a vehicle traveling an adjacent roadway. The term "upstream" will generally be used to describe movement which is parallel with but opposite to the direction a vehicle travels on an adjacent roadway. The terms "upstream" and "downstream" may also be used to describe the position of one component relative to another component in respective energy absorbing systems 20 and 320.

The terms "separate" and "separating" will generally be used to describe the results of deforming an energy absorbing element using a cutter plate to cause failure of the energy absorbing element in tension in accordance with teachings of the present invention. The terms "separate" and "separating" may also be used to describe the combined effects of ripping and tearing an energy absorbing element in accordance with teachings of the present invention.

Various components of energy absorbing systems 20 and 320 may be formed from commercially available structural steel materials. Examples of such materials include steel strips, steel plates, structural steel tubing and structural steel shapes. Examples of structural steel shapes include W shapes, HP shapes, beams, channels, tees, and angles. Structural steel angles may have legs with equal or unequal width. The American Institute of Steel Construction publishes detailed information concerning various types of commercially available steel structural materials satisfactory for use in fabricating energy absorbing systems 20 and 320.

Roadside hazard 310 may sometimes be described as a "fixed" barrier or "fixed" obstacle even though concrete barriers and other obstacles adjacent to a roadway may from time to time be moved or removed. Roadside hazard 310 may also represent a portion of a large sign post adjacent to a roadway, a bridge pillar, a center pier of a bridge or overpass, or any other structure located adjacent to a roadway and presenting a hazard to oncoming traffic. An energy absorbing system incorporating teachings of the present invention is not limited to use with only concrete barriers.

Principal components of energy absorbing system 320 as shown in FIGS. 1, 2, and 3 preferably include one or more energy absorbing assemblies 86, cutter plate or plates 106 and sled assembly 340. Cutter plate 106 may also be referred to as a "ripper" or as a "cutter blade."

One end of each energy absorbing assembly 86 is preferably attached to roadside hazard 310 by respective struts 312. For some applications energy absorbing assemblies 86 may also be fixed to the ground in front of roadside hazard 310. A plurality of spacers or cross braces 314 may be used to hold energy absorbing assemblies 86 aligned generally parallel with each other and extending longitudinally from roadside hazard 310 toward oncoming traffic.

Sled assembly 340 is slidably coupled with the end of energy absorbing assemblies 86 opposite from roadside hazard 310. Impact plate 382 may be disposed on the end of sled assembly 340 facing oncoming traffic. One or more of cutter plates 106 (not shown in FIGS. 1 and 2) are preferably provided as part of sled assembly 340. Respective cutter plates 106 are preferably slidable mounted relative to one end of each energy absorbing assembly 86 opposite from roadside hazard 310. When a motor vehicle (not expressly shown) contacts or collides with impact plate 382, sled assembly 340 will move longitudinally relative to energy absorbing assemblies 86 and roadside hazard 310. As sled assembly 340 moves toward roadside hazard 310, kinetic energy of the impacting motor vehicle will be dissipated by cutter plates 106 tearing or ripping associated energy absorbing elements 100. For some applications it may be desirable to install a section of guardrail 316 between roadside hazard 310 and sled assembly 340 on the side immediately adjacent to the roadway.

For the embodiment of the present invention as shown in FIGS. 3, 4, and 5, energy absorbing assembly 86 may sometimes be referred to as a "box beam." Each energy absorbing assembly 86 preferably includes a pair of supporting beams 90 which are disposed longitudinally parallel with each other and are spaced from each other. Supporting beams 90 have a generally C-shaped or U-shaped cross section. The C-shaped cross section of each supporting beam 90 is disposed facing each other to define a generally rectangular cross section for energy absorbing assembly 86.

Supporting beams 90 may also be described as channels. The C-shaped cross section of each support beam 90 is defined in part by web 92 and grips or flanges 94 and 96 extending therefrom. A plurality of matching holes 98 are preferably formed in both grips 94 and 96 for use in attaching energy absorbing elements 100 to opposite sides of energy absorbing assembly 86.

For the embodiment shown in FIGS. 3, 4, and 5, a pair of energy absorbing elements 100 is attached to grips 94 on one side of energy absorbing assembly 86. Another pair of energy absorbing elements 100 is attached to grips 96 on the opposite side of energy absorbing assembly 86. Spacers 104 are preferably disposed between each pair of energy absorbing elements 100 adjacent to the respective grips 94 and 96. A plurality of fasteners 103 extend through holes 98 in grips 94 and 96 and the associated energy absorbing elements 100. For the embodiment of the present invention shown in FIGS. 3, 4 and 5, energy absorbing elements 100 have a relatively uniform thickness. As discussed later in more detail with respect to energy absorbing assembly 486 shown in FIG. 7 and energy absorbing elements 152a, b, c and d shown in FIG. 20, it may be desirable to vary the thickness and/or number of energy absorbing elements extending along the length of an energy absorbing assembly.

Fasteners 103 allow easy replacement of energy absorbing elements 100 after collision of a motor vehicle with impact plate 382. A wide variety of fasteners may be satisfactorily used to attach energy absorbing elements 100 with supporting beams 90.

Energy absorbing elements 100 may be formed from various types of metal alloys. For some applications, mild steel is preferred. The number of energy absorbing elements 100 and their length and thickness may be varied depending upon the intended application for the resulting energy absorbing assembly. Increasing the number of energy absorbing elements, increasing their thickness, and/or increasing the length of energy absorbing elements 100, will allow the resulting energy absorbing assembly to dissipate an increased amount of kinetic energy. Energy absorbing elements 100 may also be referred to as rip plates or shear plates. Benefits of the present invention include the ability to vary the geometric configuration and number of energy absorbing elements 100 and to select appropriate metal alloys depending upon the intended application for the resulting energy absorbing system.

For the embodiment shown in FIG. 3, cutter plate 106 includes a pair of beveled cutting edges or ripping edges 107 and 109 which are disposed at first end 101 of respective energy absorbing assembly 86. Cutting edges 107 and 109 may also be described as rip blades. The thickness of cutter plates 106 and gap 118 between supporting beams 90 are selected to allow cutter plate 106 to fit between grips 94 and 96 and the adjacent supporting beams 90.

Slots 102 are preferably formed in the end of each energy absorbing element 100 adjacent to respective cutter plate 106. Cutting edges 107 and 109 are preferably disposed at an acute angle relative to energy absorbing elements 100. For the embodiment shown in FIG. 3, cutting edges 107 and 109 are hardened and formed at an angle of approximately forty-five degrees relative to the associated energy absorbing elements 100. The configuration of cutting edges 107 and 109, including their orientation relative to energy absorbing elements 100, is selected to cause the associated energy absorbing elements 100 to fail in tension as they are stretched between the respective grips 94 and 96 of the associated support beams 90.

Energy absorbing elements 100 and other metal components of energy absorbing system 320 are preferably galvanized to insure that they retain their desired tensile strength and are not affected by environmental conditions which could cause rust or corrosion during the life of the associated energy absorbing system 320. Specific dimensions of cutting edges 107 and 109, along with their angular relationship relative to energy absorbing elements 100, may be varied depending upon the amount of kinetic energy which will be dissipated by energy absorbing assembly 86.

When a motor vehicle collides with or contacts impact fence 382, the force of the collision or impact is transmitted to energy absorbing assemblies 86 by cutter plate 106. As sled assembly 340 slides longitudinally toward roadside hazard 310, the kinetic energy of an impacting vehicle is dissipated through cutting or ripping of energy absorbing elements 100 by cutter plate 106 as shown, for example, in FIG. 5.

For relatively low speed impacts, such as between approximately five miles per hour and eighteen miles per hour or higher, one or more relatively short lengths of energy absorbing elements 100 may be installed immediately adjacently to cutter plate 106. Thus, following a low speed impact only relatively short lengths of energy absorbing elements 100 will require replacement which substantially simplifies repair and maintenance of energy absorbing system 320.

As shown in FIG. 2, energy absorbing assemblies 86 are preferably secured to each other by a plurality of cross braces 314. Cooperation between impact fence 382, cross braces 314 and energy absorbing assemblies 86 results in energy absorbing system 320 having a very rigid frame structure. As a result, energy absorbing system 320 is better able to safely absorb impact from a motor vehicle that strikes impact fence 382 either offset from the center of impact fence 382 or that strikes impact fence 382 at an angle other than parallel with energy absorbing assemblies 86.

Energy absorbing assemblies 186 and 486 incorporating alternative embodiments of the present invention are shown respectively in FIGS. 6 and 7. Energy absorbing assemblies 186 and 486 may be satisfactorily used with energy absorbing systems 20 and 320. Energy absorbing assembly 186 shown in FIG. 6 includes a pair of supporting beams or channels 190 similar to previously described supporting beams 90 for energy absorbing assembly 86. Energy absorbing assembly 186 is shown with only two energy absorbing elements or rip plates 152 disposed on opposite sides thereof. Channels 190 are spaced from each other to define cutting zone or gap 154 therebetween.

Figure 13:
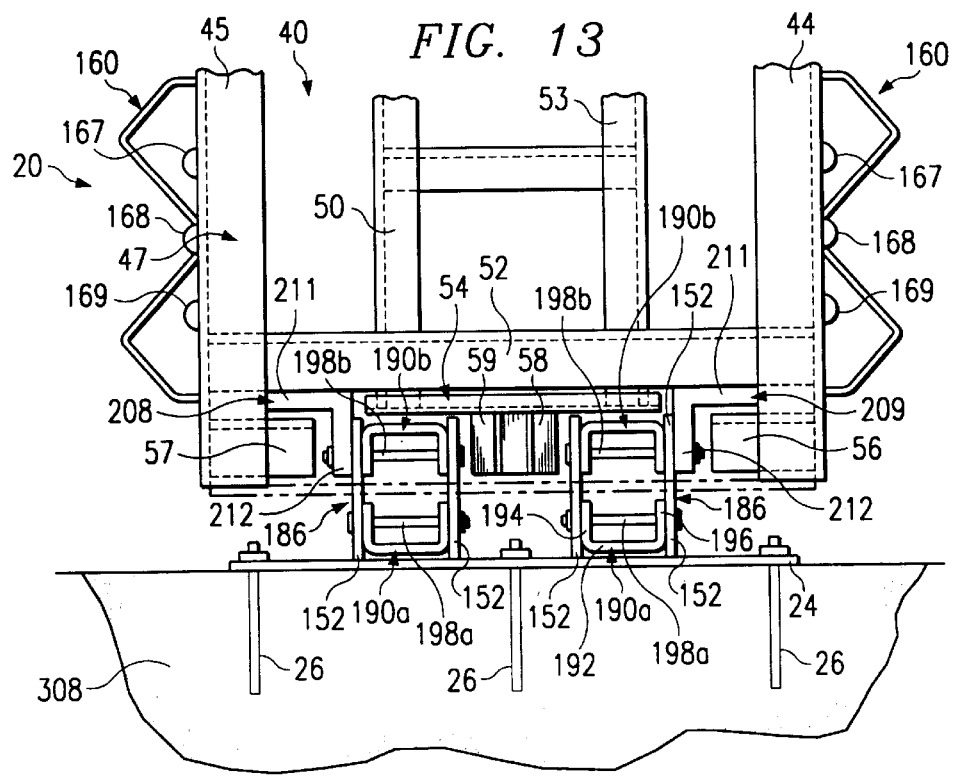
FIG. 13 is a schematic drawing end section with portions broken away showing one end of the sled assembly of FIG. 12 opposite from oncoming traffic.
Figure 15:
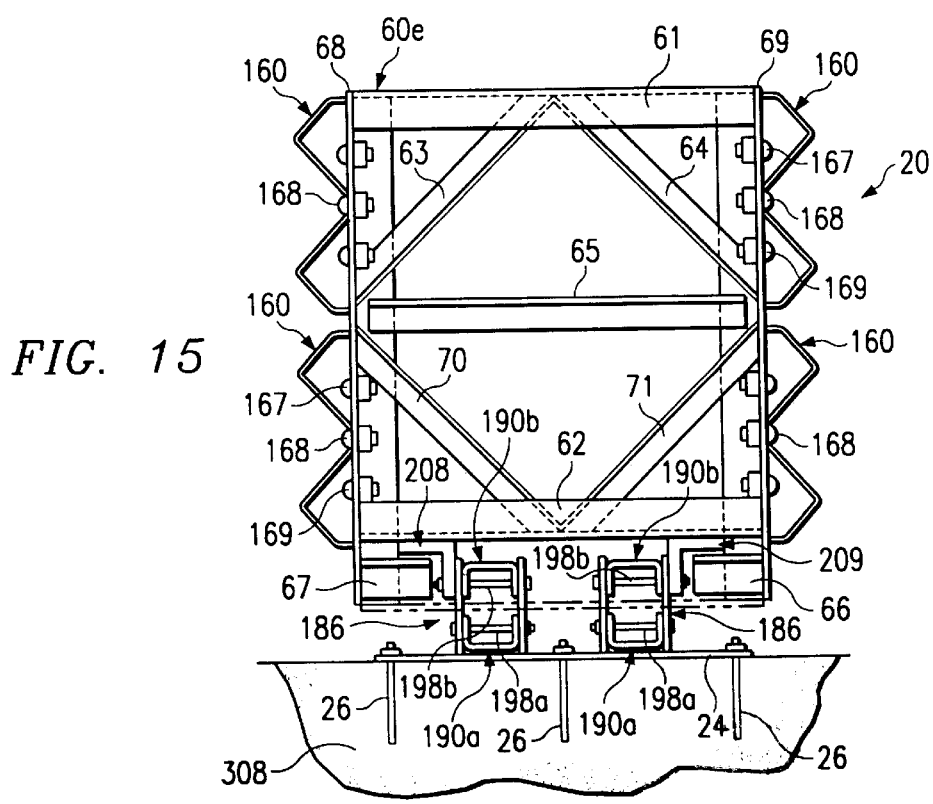
FIG. 15 is a schematic drawing end section with portions broken away taken along lines 15—15 of FIG. 10 showing a slidable support frame and attached panels.
Figure 16:
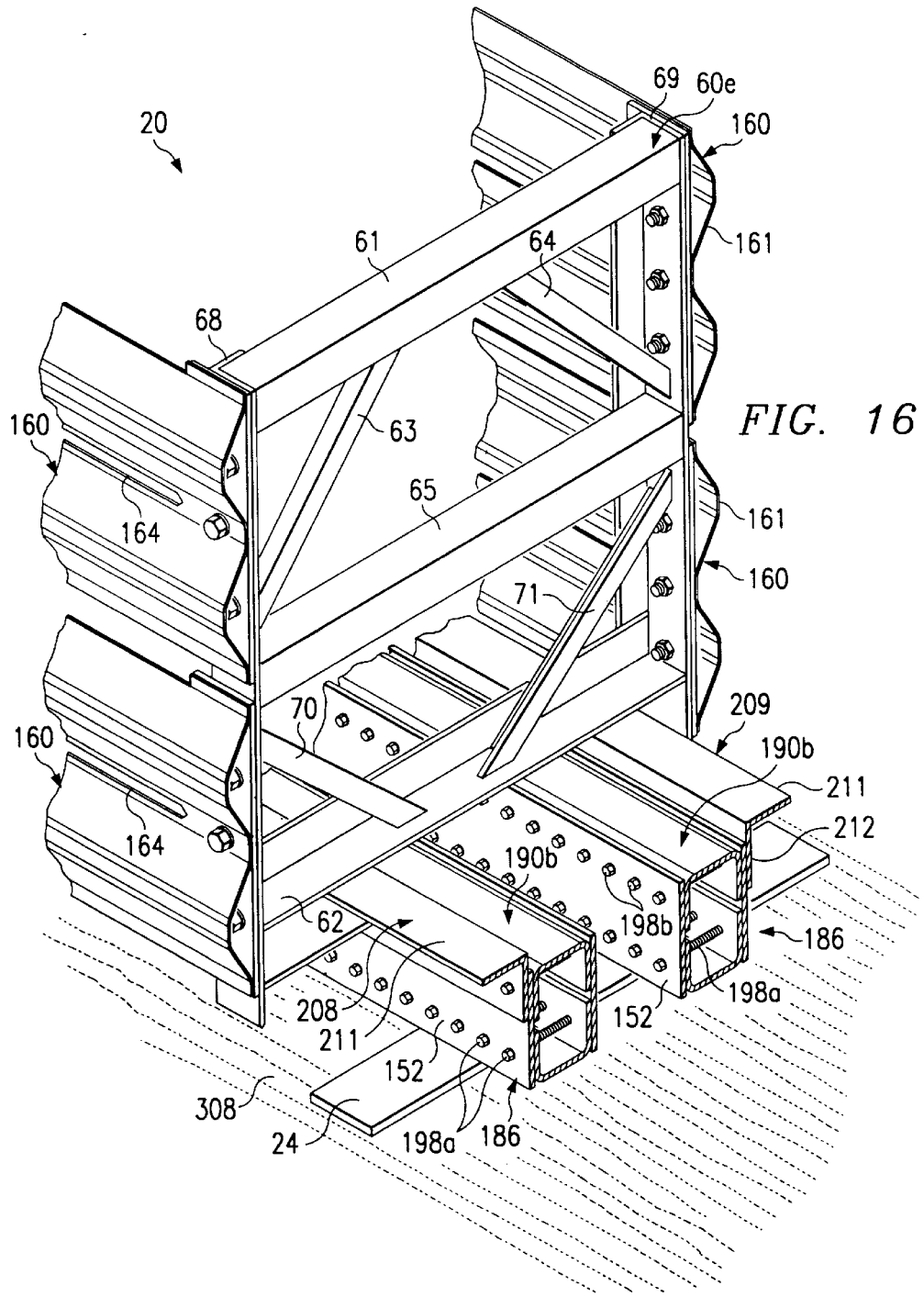
FIG. 16 is a schematic drawing with portions broken away showing an isometric view of the slidable support member and attached panels as shown in FIG. 15.

Energy absorbing elements 152 may be attached to supporting beams 190 using various types of fasteners including bolts 103 as previously described for energy absorbing assemblies 86. Mechanical fasteners 198a and 198b as shown in FIGS. 13, 15 and 16 may also be used to attach energy absorbing elements 152 with supporting beams 190. Alternatively, energy absorbing elements 152 may be attached to supporting beams 190 using other types of fasteners such as Huck bolts, rivets, by welding or by various adhesives. One of the main requirements is attaching energy absorbing elements 152 with supporting beams 190 to provide an appropriately sized cutting zone 154 between supporting beams 190 to accommodate the associated cutter plate (not shown). Energy absorbing assemblies having other configurations such as shown in corresponding U.S. patent application Ser. No. 08/870,118 filed Jun. 5, 1997 (now U.S. Pat. No. 5,947,452) may be satisfactorily used with an energy absorbing system incorporating teachings of the present invention.

FIG. 7 is an exploded schematic drawing showing energy absorbing assembly 486. Some of the differences between energy absorbing assemblies 86 and energy absorbing assembly 486 include variations in the length and thickness of the energy absorbing elements which are replaceably secured to energy absorbing assembly 486. Energy absorbing assembly 486 may be formed using supporting beams 90 as previously described with respect to energy absorbing assembly 86.

For one application, supporting beams or C-channels 90 have an overall length of approximately eleven feet with a web width of approximately five inches and a flange height of approximately two inches. Multiple energy absorbing elements or rip plates 402, 404, 406, 408, 410 and 412 and multiple spacers 416 and 418 are preferably attached to C-channels 90 by threaded fasteners. For the example shown in FIG. 7, the same number and configuration of energy absorbing elements 402, 404, 406 of various lengths and thicknesses are secured on opposite sides of C-channels 90. For one application, energy absorbing elements 402, 404, 406, 408, 410, and 412 were formed from galvanized mild steel plates. The number of energy absorbing elements, their thickness and location on the exterior of energy absorbing assembly 486 is selected to provide the desired deceleration characteristics for various sizes and types of vehicles both during high speed and low speed impacts.

Spacers 416 and 418 are provided between energy absorbing elements 410 and 412 on both sides of energy absorbing assembly 486. One of the technical benefits of the present invention includes the ability to vary the number, size and location of energy absorbing elements on each side of an energy absorbing assembly to provide the desired deceleration characteristics.

Centerline slot 102 is preferably formed in energy absorbing elements 402 and 404 immediately adjacent to the first end of energy absorbing assembly 486 to receive the associated cutter plate. For one application, slot 102 is formed along the centerline of energy absorbing elements 402 and 404 with an opening of approximately one and one-half inches tapering to a radius of approximately one-half inch in width over a length of approximately six inches. For some applications, energy absorbing elements 402 and 404 may be replaceably secured with the respective supporting beams 90 by using relatively short mechanical fastener 422. Also, the length of energy absorbing elements 402 and 404 is relatively short in comparison with other energy absorbing elements which are attached to and form a part of energy absorbing assembly 486. The use of relatively short mechanical fasteners 422 and relatively short energy absorbing elements 402 and 404 allow energy absorbing assembly 486 to be quickly repaired and returned to service after a relatively minor impact. Mechanical fasteners 424, preferably extend from one side of energy absorbing assembly 486 to the other side of energy absorbing assembly 486. Mechanical fasteners 422 and 424 may be bolts or Hucks as previously described.

Energy absorbing elements 402, 404, 406, 408, 410 and 412 provide stopping force that has been tailored for specific vehicle weights. For example, during approximately the first few feet of travel, of an associated cutter plate through energy absorbing assembly 486, two stages of stopping force appropriate for a vehicle weighing approximately 820 kilograms are provided. The remaining travel of a cutter plate through energy absorbing assembly 486 provides stopping force that is appropriate for larger vehicles weighing approximately 2,000 kilograms. Variations in the location, size, configuration and number of energy absorbing elements 402, 404, 406, 408, 410 and 412 allows energy absorbing assembly 486 to provide safe deceleration of vehicles weighing between 820 kilograms and 2,000 kilograms.

Energy absorbing element 200 as shown in FIG. 8 has been modified to reduce the initial effects of an impact between a moving vehicle and an energy absorbing system incorporating teachings of the present invention, particularly with respect to lightweight vehicles. For some applications, center line slot 202 at first end 201 of energy absorbing element 200 may have a width of approximately three quarters of an inch and a length of approximately six inches. Slot 202 is used to receive cutter plate 206 during installation and to align cutter plate 206 with energy absorbing elements 200. A plurality of elongated, oval slots 204 are preferably formed along the center line of energy absorbing element 200 extending from slot 202. For one application, oval slots 204 have a length of approximately two and one half (2½) inches and a width of approximately three quarters (¾) of an inch. The distance between the center line of adjacent oval slots 204 is approximately three inches. The number of oval slots 204 and the dimensions of oval slots 204 may be varied depending upon the intended application for the associated energy absorbing assembly. For one application, energy absorbing element 200 has an overall length of forty-five (45) inches and a width of four and one half (4½) inches. Oval slots 204 reduce the energy required to initiate ripping or tearing of energy absorbing element 200 on initial impact particularly with respect to a lightweight vehicle. Oval slots 204 cooperate with each other to substantially minimize the initial impact or jolt experienced by a lightweight vehicle colliding with sled assembly 340.

For some applications, energy absorbing element 200 is preferably disposed immediately adjacently to the respective cutter plate 106. Limiting the overall length of energy absorbing element 200 to approximately forty-five (45) inches reduces the time and cost of returning energy absorbing system 20 or 320 to service following a collision by a lightweight vehicle or a slow speed vehicle with sled assembly 340, if repair is deemed appropriate. After a collision which did not require absorbing a substantial amount of energy, it may only be necessary to replace energy absorbing elements 200 and not all of the energy absorbing elements which are attached to the associated energy absorbing assembly 86.

Various types of mechanical fasteners may be satisfactorily used to releasably attach energy absorbing elements 100, 200, and/or 402, 404, 406, 408, 410 and 412 with the associated support beams 90. For some applications, a combination of long bolts and short bolts may be satisfactorily used. For other applications, the mechanical fasteners may be blind threaded rivets and associated nuts. A wide variety of blind rivets, bolts and other fasteners may be satisfactorily used with the present invention. Examples of such fasteners are available from Huck International, Inc., located at 6 Thomas, Irvine, Calif. 92718-2585. Power tools satisfactory for installing such blind rivets are also available from Huck International and other vendors.

Figure 9A:
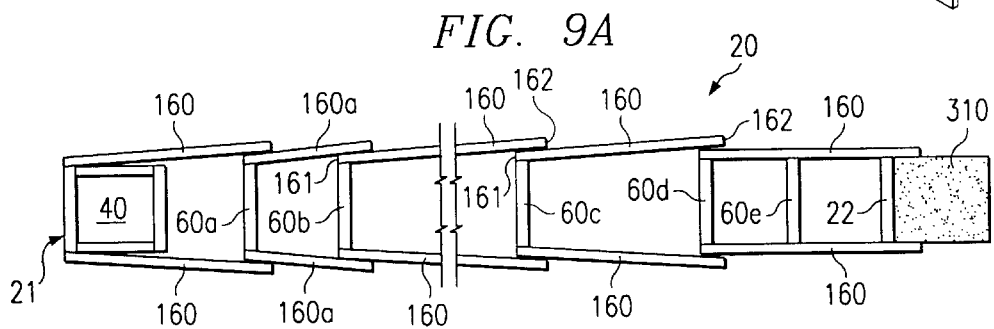
FIG. 9A is a schematic drawing showing a plan view with portions broken away of another energy absorbing system incorporating teachings of the present invention installed adjacent to one end of a fixed roadside hazard.
Figure 9B:
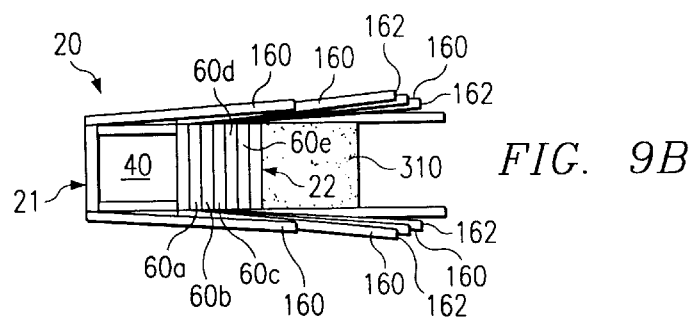
FIG. 9B is a schematic drawing showing a plan view with portions broken away after a motor vehicle has collided with or impacted one end of the energy absorbing system of FIG. 9A opposite from the fixed roadside hazard.
Figure 9C:
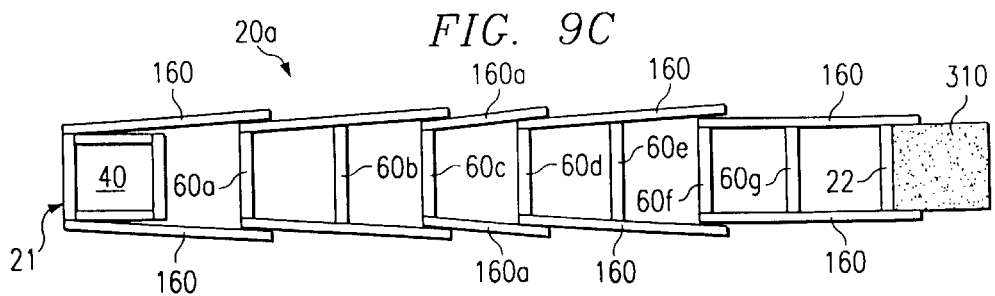
FIG. 9C is a schematic drawing showing a plan view of still another energy absorbing system incorporating teachings of the present invention installed adjacent to one end of a fixed roadside hazard.

Energy absorbing system 20 incorporating teachings of the present invention is shown in FIGS. 9A, 9B and 10 installed adjacent to one end of roadside hazard 310 facing oncoming traffic. Energy absorbing system 20a incorporating a further embodiment of the present invention is shown in FIG. 9C. Energy absorbing systems 20 and 20a may be formed from substantially the same components. Some of the differences between energy absorbing system 20 and 20a will be discussed later in more detail. Energy absorbing systems 20 and 20a may sometimes be described as "nongating, redirective crash cushions."

Portions of energy absorbing system 20 are shown in FIGS. 11–20. Various components and features of energy absorbing system 320 such as energy absorbing assemblies 86, 186 and 486 and energy absorbing elements 100, 152, 200, 402, 404, 406, 408, 410 and 412 may be incorporated into energy absorbing systems 20 and 20a as desired. Energy absorbing systems 20, 20a and 320 dissipate kinetic energy by moving a cutter plate or cutter blade through respective energy absorbing elements which remain in a generally fixed position relative to roadside hazard 310.

FIG. 9A is a schematic plan view showing energy absorbing system 20 in its first position, extending longitudinally from roadside hazard 310. Sled assembly 40 is slidably disposed at first end 21 of energy absorbing system 20. Sled assembly 40 may sometimes be referred to as an "impact sled."

First end 21 of energy absorbing system 20 including first end 41 of sled assembly 40 faces oncoming traffic. Second end 22 of energy absorbing system 20 is preferably securely attached to the end of roadside hazard 310 facing oncoming traffic. Energy absorbing system 20 is installed in its first position with first end 21 longitudinally spaced from second end 22 as shown in FIG. 9A.

A plurality of panel support frames 60a–60e are spaced longitudinally from each other and slidably disposed between first end 21 and second end 22. The number of panel support frames may be varied depending upon the desired length of the associated energy absorbing system. Panel support frames 60a–60e may sometimes be referred to as "intermediate frames."

Multiple panels 160 are respectively attached to sled assembly 40 and panel support frames 60a–60e. Panels 160 may sometimes be referred to as "fenders" or "fender panels."

When a vehicle impacts with first end 21 of energy absorbing system 20, sled assembly 40 will move longitudinally toward fixed roadside hazard 310. Energy absorbing assemblies 186 (not expressly shown in FIGS. 9A and 9B) will absorb energy from the impacting vehicle during this movement. Panel support frames 60a–60e and associated panels 160 will also absorb energy from a vehicle impacting first end 21. FIG. 9B is a schematic plan view which shows sled assembly 40 and panel support frames 60a–60e and their associated panels 160 collapsed adjacently to each other. Further longitudinal movement of sled assembly 40 toward roadside hazard 310 is prevented by panel support frames 60a–60e.

For purposes of explanation, the position of energy absorbing system 20 as shown in FIG. 9B may be referred to as the "second" position. During most vehicle collisions with end 21 of energy absorbing system 20, sled assembly 40 will generally move only a portion of the distance between the first position as shown in FIG. 9A and the second position as shown in FIG. 9B.

Panel support frames 60a–60e, associated panels 160 and other components of energy absorbing system 20 cooperate with each other to redirect vehicles striking either side of energy absorbing system 20 back onto the associated roadway. Respective panels 160 are attached to sled assembly 40 and preferably extend over a portion of respective panels 160 attached to panel support frame 60a. In a corresponding manner, panels 160 attached to panel support frame 60*a* preferably extend over a corresponding portion of panels 160 attached to panel support frame 60*b*.

First end 161 of each panel 160 is preferably securely attached to sled assembly 40 or panel support frame 60*a*–60*d* as appropriate. Each panel 160 is also preferably slidably attached to one or more downstream panel support frames 60*a*–60*e*. Up stream panels 160 overlap down stream panels 160 to allow telescoping or nesting of respective panels 160 as panel support frames 60*a*–60*e* slide toward each other. Subsets of panel support frames 60*a*–60*e* and panels 160 may be grouped together to form a one-bay group or a two-bay group. Various components of energy absorbing system 20 provide substantial lateral support to panel support frames 60*a*–60*e* and panels 160.

For purposes of illustration, second end 162 of each upstream panel 160 is shown in FIGS. 9A and 9B projecting a substantial distance laterally at the overlap with the associated downstream panel 160. As discussed later in more detail, panels 160 incorporating teachings of the present invention will preferably nest closely with each other to minimize any lateral projection at second end 162 which might snag a vehicle during a reverse angle impact with either side of energy absorbing system 20.

FIG. 9C is a schematic plan view showing energy absorbing system 20*a* in its first position, extending longitudinally from roadside hazard 310. Energy absorbing system 20*a* includes first end 21 facing oncoming traffic and second end 22 securely attached to roadside hazard 310. Energy absorbing system 20*a* also includes sled assembly 40, panel support frames 60*a*–60*g* and respective panels 160.

Panels 160 extending along both sides of energy absorbing systems 20 and 20*a* have substantially the same configuration. However, the length of panels 160 may vary depending on whether the respective panel 160 is used as a "one-bay panel" or for a "two-bay panel." For purposes of explanation, a "bay" is defined as the distance between two adjacent panels support frames.

The length of panels 160 designated as "two-bay panels" is selected to span the distance between three-panel support frames when energy absorbing systems 20 and 20*a* are in their first position. For example, as discussed later in more detail, first end 161 of a two-bay panel 160 is securely attached to an upstream panel support frame 60*a*. Second end 162 of two-bay panel 160 is slidably attached to a downstream panel support frame 60*c*. Another panel support frame 60*b* is slidably coupled with two-bay panels 160 intermediate first end 161 and second end 162.

When sled assembly 40 hits panel support frame of a one-bay group (e.g., panel support frame 60*c*), the panel support frame and attached panels 160 are accelerated toward the roadside hazard 310. The inertia of the panel support frame and attached panels 160 contributes to the deceleration of the impacting vehicle. If the panel support frame of the one-bay group is hit, the one-bay group will be coupled to its own associated panels 160 and, therefore, will have relatively high inertia. To soften deceleration of an impacting vehicle, a two-bay group is preferably disposed downstream from each one-bay group. When sled assembly 40, or one or more panel support frames being pushed by sled assembly 40, contacts the first panel support frame of a two-bay group (e.g., panel support frame 60*d*), the inertia is the same or slightly more than (because of the longer panels 160) the inertia of a one-bay group. However, when the second panel support frame of the two-bay group (e.g., panel support frame 60*e*) is contacted, the second panel support frame 60 has a lower inertia because it is only slidably coupled to the associated panels 160. Therefore, deceleration is somewhat reduced.

Energy absorbing system 20*a* has the following groups of bays: 2-2-1-2-2, where "2" means two bays and "1" means one bay. Beginning at sled assembly 40 and moving toward roadside hazard 310, energy absorbing system 20*a* has a two-bay group (counting sled assembly 40 as a bay in and of itself), another two-bay group, a one-bay group, followed by a two-bay group and another two-bay group.

As best shown in FIG. 10, nose cover 83 may be attached to sled assembly 40 at first end 21 of energy absorbing system 20. Nose cover 83 may be a generally rectangular sheet of flexible plastic type material. Opposite edges of nose cover 83 are attached to corresponding opposite sides of end 41 of sled assembly 40. End 41 of sled assembly 40 is normally located at first end 21 of energy absorbing system 20. Nose cover 83 preferably includes a plurality of chevron delineators 84 which are visible to oncoming traffic approaching roadside hazard 310. Various types of reflectors and/or warning signs may also be mounted on sled assembly 40 and along each side of energy absorbing system 20.

Energy absorbing system 20 preferably includes multiple energy absorbing assemblies 186 aligned in respective rows 188 and 189 (See FIG. 20) extending generally longitudinally from fixed roadside hazard 310 and parallel with each other. For some applications, each row 188 and 189 may contain two or more energy absorbing assemblies 186.

For the embodiment of the present invention as shown in FIG. 20, energy absorbing assembly 186 in row 188 is spaced laterally from energy absorbing assembly 186 in row 189. Rows 188 and 189 and/or energy absorbing assemblies 186 may sometimes be referred to as a "guidance track" for sled assembly 40 and panel support frames 60*a*–60*e*.

An energy absorbing system incorporating teachings of the present invention may have energy absorbing assemblies arranged in various configurations. For some applications, only a single row of energy absorbing assemblies may be installed adjacent to roadside hazard 310. For other applications, three or more rows of energy absorbing assemblies may be installed. Also, each row may only have one energy absorbing assembly or multiple energy absorbing assemblies.

As discussed later in more detail, energy absorbing assemblies 186 are preferably securely attached to concrete foundation 308 in front of roadside hazard 310. Each row 188 and 189 of energy absorbing assemblies 186 has a respective first end 187 which corresponds generally with first end 21 of energy absorbing system 20. First end 41 of sled assembly 40 is preferably disposed adjacent to first end 187 of rows 188 and 189 prior to a vehicle impact.

Ramp assembly 30 is preferably provided at end 21 of energy absorbing system 20 to prevent small vehicles or vehicles with low ground clearance from directly impacting first end 187 of rows 188 and 189. If ramp assembly 30 is not provided, a small vehicle or vehicle with low ground clearance may contact either or both first ends 187 and experience severe deceleration with substantial damage to the vehicle and/or injury to occupants in the vehicle.

Figure 11:
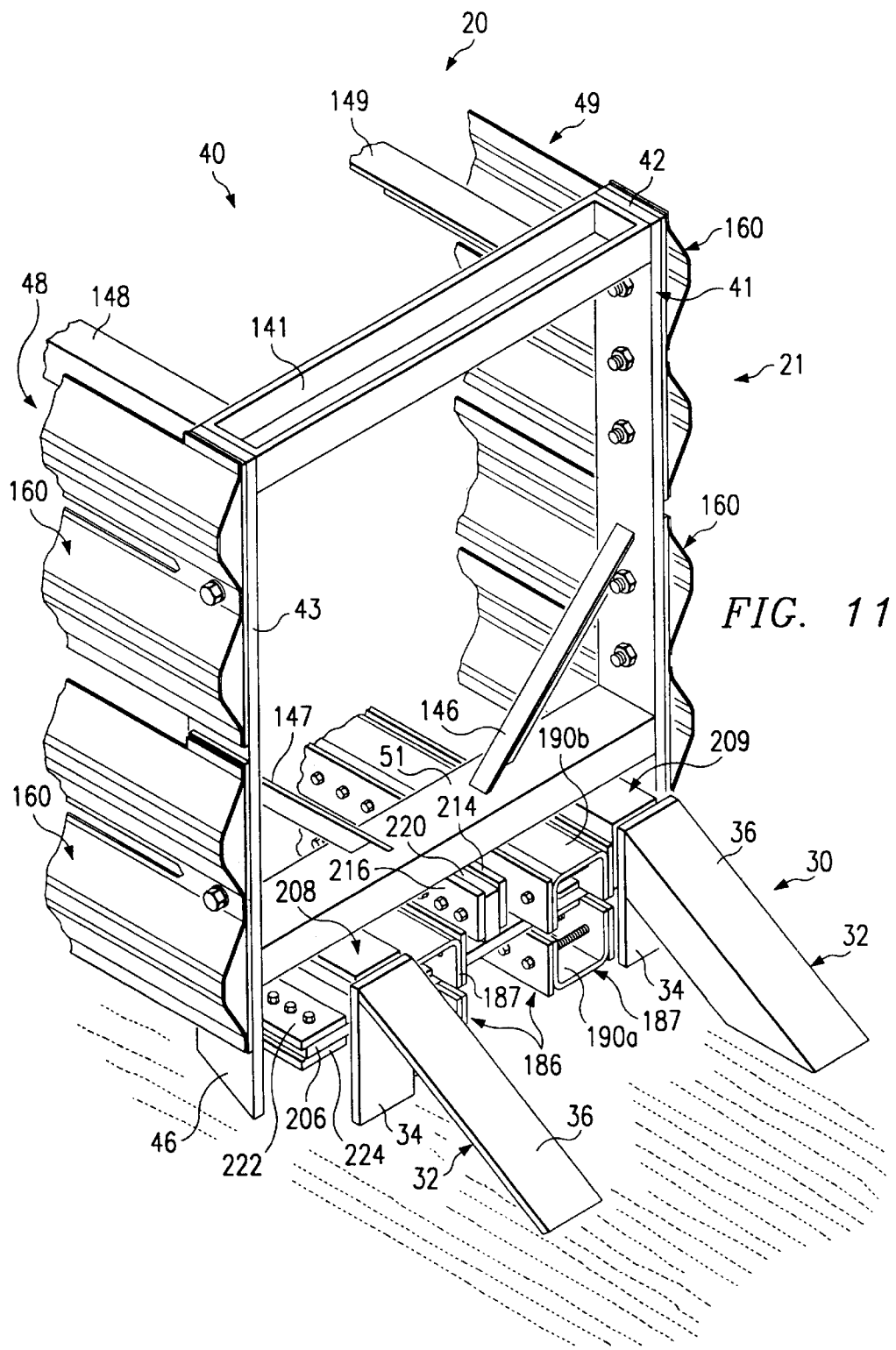
FIG. 11 is a schematic drawing with portions broken away showing an isometric view of a sled assembly and other components at the end of the energy absorbing system of FIG. 10 opposite from the fixed roadside hazard.
Figure 14:
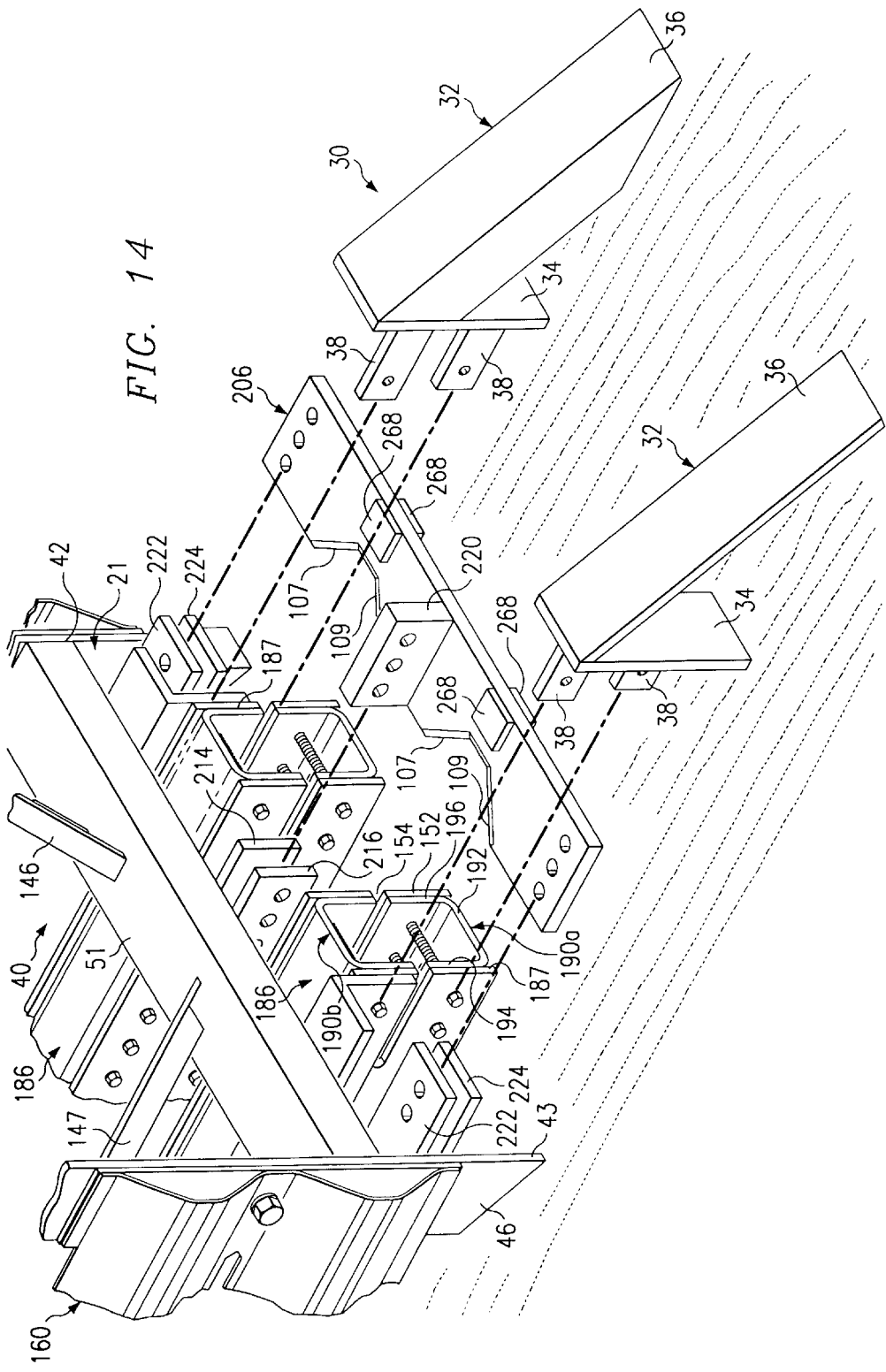
FIG. 14 is a schematic drawing with portions broken away showing an exploded isometric view of the sled assembly, cutter plate and ramp associated with the energy absorbing system of FIG. 10.

Various types of ramps and other structures may be provided to ensure that a vehicle impacting end 21 of energy absorbing 20 will properly engage sled assembly 40 and not directly contact first ends 187 of rows 188 and 189. For the embodiment of the present invention as shown in FIGS. 10, 11, and 14, ramp assembly 30 includes a pair of ramps 32. Each ramp 32 preferably includes leg 34 with tapered surface 36 extending therefrom. Connectors 38 extend from leg 34 opposite from tapered surface 36. As best shown in FIG. 14, connectors 38 allow each ramp 32 to be securely engaged with respective energy absorbing assembly 186.

For some applications, leg 34 may have a height of approximately six and one-half inches. Other components associated with energy absorbing system 20 such as energy absorbing assemblies 186 and guide rails 208 and 209 will preferably have a generally corresponding height. Limiting the height of ramps 32 and energy absorbing assemblies 186 will allow such components to pass under a vehicle impacting with end 41 of sled assembly 40.

Tapered surfaces 36 may have a length of approximately thirteen and one-half inches. Tapered surfaces 36 may be formed by cutting a structural steel angle (not expressly shown) having nominal dimensions of three inches by three inches by one-half inch thick into sections with appropriate lengths and angles. The sections of structural steel angle may be attached to respective legs 34 using welding techniques and/or mechanical fasteners. Ramps 32 may also be referred to as "end shoes."

For some applications, roadside hazard 310 and/or energy absorbing system 20 may be disposed on and attached to a suitable concrete foundation. For the embodiment shown in FIGS. 10, 13 and 15, concrete foundation 308 preferably extends both longitudinally and laterally from roadside hazard 310. As best shown in FIGS. 13, 15, 16 and 20 energy absorbing assemblies 186 are preferably disposed on and secured to a plurality of cross ties 24. Each cross tie 24 is preferably secured to concrete foundation 308 using respective bolts 26. Various types of mechanical fasteners in addition to bolts 26 may be satisfactorily used to secure cross ties 24 with concrete foundation 308.

For the embodiment of the present invention as shown in FIGS. 10–20, cross ties 24 may be formed from structural steel strips having a nominal width of three inches and a nominal thickness of one half inch. The length of each cross tie 24 may be approximately twenty-two inches. Three holes are preferably formed in each cross tie 24 to accommodate bolts 26. During a vehicle collision with either side of energy absorbing system 20, cross ties 24 are placed in tension. The materials used to form cross ties 24 and their associated configuration are selected to allow cross ties 24 to deform in response to tension from such side impacts and to absorb energy from the impacting vehicle.

Energy absorbing assemblies 186 are similar to previously described energy absorbing assemblies 86. For example, see FIGS. 6, 13 and 15. For purposes of describing embodiments of the present invention as shown in FIGS. 9A–20, supporting beams 190 immediately adjacent to cross ties 24 are designated 190a. The respective supporting beams 190 disposed immediately there above are designated 190b. Supporting beams 190a and 190b have substantially identical dimensions and configurations (See FIG. 13) including respective web 192 with grips or flanges 194 and 196 extending therefrom. For the embodiment as shown in FIGS. 9A–20, four cross ties 24 are preferably attached to web 192 of supporting beams 190a opposite from respective flanges 194 and 196. As a result, the generally C-shaped cross section of each supporting beam 190a extends away from respective cross ties 24.

The number of cross ties 24 attached to each supporting beam 190a may be varied depending upon the intended use of the resulting energy absorbing system. For energy absorbing system 20, two supporting beams 190a are spaced laterally from each other and attached to four cross ties 24. Conventional welding techniques and/or mechanical fasteners (not expressly shown) may be used to attach supporting beams 190a with cross ties 24.

A plurality of energy absorbing elements 152 is preferably attached to respective supporting beams 190a and 190b using mechanical fasteners 198a and 198b. For some applications each energy absorbing element 152 may have substantially the same configuration and dimensions. For other applications such as shown in FIG. 20 energy absorbing elements 152a, 152b, 152c, 152d, 152e and 152f with varying lengths, widths, and thicknesses may be used to form energy absorbing assemblies 186.

A pair of guide rails or guide beams 208 and 209 are preferably attached to and extend laterally from respective supporting beams 190b. Guide rails 208 and 209 are preferably formed from structural steel angles having legs of equal width such as three inches by three inches and a thickness of approximately one-half of an inch. Guide rails 208 and 209 each have first leg 211 and second leg 212 which intersect each other at approximately a ninety-degree angle. A plurality of holes (not expressly shown) is preferably formed along the length of second leg 212 to allow attaching guide rails 208 and 209 with mechanical fasteners 198b to respective supporting beams 190b. Mechanical fasteners 198b are preferably longer than mechanical fasteners 198a to accommodate guide rails 208 and 209 and longitudinal force causing sled assembly 40 to move toward roadside hazard 310.

As shown in FIGS. 10, 11, 13 and 14, sled assembly 40 is slidably disposed on guide rails 208 and 209. As best shown in FIGS. 15 and 16, panel support frames 60a–60e are also slidably disposed on guide rails 208 and 209. For the embodiment of the present invention as shown in FIG. 10, the length of guide rails 208 and 209 is longer than the length of the associated rows 188 and 189 of energy absorbing assemblies 186. When energy absorbing system 20 is in its second position as shown in FIG. 9B, panel support frames 60a–60e are disposed immediately adjacently to each other which prevents further movement of sled assembly 40. Therefore, it is not necessary for rows 188 and 189 of energy absorbing assemblies 186 to have the same length as guide rails 208 and 209.

For the embodiment of the present invention as represented by energy absorbing system 20, sled assembly 40 has the general configuration of an open sided box. See FIG. 12. The materials used to form sled assembly 40 and their configuration are preferably selected to allow sled assembly 40 to remain intact after impact by a high speed vehicle. First end 41 of sled assembly 40 corresponds generally with first end 21 of energy absorbing system 20. End 41 may also be referred to as the "upstream" end of sled assembly 40. End 47 of sled assembly 40 is disposed opposite from end 41. End 47 may also be referred to as the "downstream" end of sled assembly 40. Sled assembly 40 also includes sides 48 and 49 which extend between ends 41 and 47. As shown in FIGS. 11 and 13, sides 48 and 49 of sled assembly 40 are preferably covered by panels 160. For purposes of illustration, panels 160 have been removed from side 48 in FIG. 12.

Sled assembly 40 is further defined by corner posts 42, 43, 44 and 45 which extend generally vertically from guide rails 208 and 209. For the embodiment of the present invention as shown in FIGS. 10–14, corner posts 42 and 43 may be formed from structural steel strips having a width of approximately four inches, a thickness of approximately three quarters of an inch. Each corner post 42 and 43 has a length of approximately thirty-two inches. Tapered surface 46 is preferably formed on the end of each corner post 42 and 43 immediately adjacent to the ground or concrete foundation 308. The dimensions and configuration of tapered surfaces 46 is preferably selected to minimize or eliminate contact between concrete foundation 308 and respective ends of corner posts 42 and 43 that might prevent smooth linear movement of sled assembly 40 along guide rails 208 and 209 toward roadside hazard 310.

Corner posts 44 and 45 may be formed from structural steel angles having legs of equal width such as two and one half inches by two and one half inches and a thickness of approximately three-eighths of an inch. Corner posts 44 and 45 preferably have a length of approximately twenty-nine inches. Various configurations of braces and supports may be used to rigidly attach corner post 42, 43, 44 and 45 with each other to provide the desired structural strength for sled assembly 40.

For the embodiment of the present invention as shown in FIGS. 10–14, top brace 141 preferably extends laterally between corner posts 42 and 43. Top brace 142 preferably extends laterally between corner posts 44 and 45. A pair of top braces 148 and 149 extend longitudinally between top braces 141 and 142 along respective sides 48 and 49 of sled assembly 40. Bottom brace 51 preferably extends laterally between corner post 42 and corner post 43 immediately above guide rails 208 and 209. Another bottom brace 52 preferably extends laterally between corner post 44 and corner post 45 immediately above guide rails 208 and 209.

End 41 of sled assembly 40 also includes braces 146 and 147 extending diagonally between respective corner posts 42 and 43 and bottom brace 51. Corner posts 42 and 43, top brace 141, bottom brace 51 and braces 146 and 147 cooperate with each other to provide a very rigid, strong structure at first end 41 of sled assembly 40. End 47 of sled assembly 40 includes diagonal braces 143, 144 and 145 along with diagonal braces 146 and 147 to provide additional structural support for sled assembly 40.

The dimensions of end 41 of sled assembly 40 which are defined in part by corner posts 42 and 43, top brace 141 and bottom brace 51 are selected to catch or gather an impacting vehicle. During a collision between a motor vehicle and first end 21 of energy absorbing assembly 20, kinetic energy from the colliding vehicle is transferred from first end 41 to other components of sled assembly 40. The dimensions and configuration of end 41 may also be selected to effectively transfer kinetic energy even if a vehicle does not impact the center of first end 41 or if a vehicle impacts end 41 at an angle other than parallel with the longitudinal axis of energy absorbing system 20.

A pair of C-shaped channels 50 and 53 preferably extend diagonally from top brace 141 to bottom brace 52. Channels 50 and 53 are preferably spaced laterally from each other and laterally from corner posts 42 and 43 and corner posts 44 and 45. Guide assembly 54 is preferably attached to the ends of channels 50 and 53 extending from bottom brace 52. The length of channels 50 and 53 is selected to ensure that guide assembly 54 will contact web 192 of respective supporting beams 190b.

Guide assembly 54 preferably includes plate 55. The end of channels 50 and 53 extending from bottom brace 52 are attached to one side of plate 55. A pair of guides 58 and 59 are preferably attached to and extend generally vertically from the opposite side of plate 55. Guides 58 and 59 are disposed at an angle relative to each other and the center of guide assembly 54 to assist in maintaining sled assembly 40 properly positioned between rows 188 and 189 of energy absorbing assemblies 186. Plate 55 may sometime be referred to as a guide shoe or skid. Guides 58 and 59 may sometimes be referred to as "diverters."

Respective tabs 56 and 57 are attached to the bottom end of corner posts 44 and 45 adjacent to energy absorbing assemblies 186. Tabs 56 and 57 project laterally inward from respective corner posts 44 and 45 toward and under guide rails 208 and 209. Bottom brace 52 is preferably spaced from tabs 56 and 57 such that legs 211 of guide rails 208 and 209 may be respectively disposed between tabs 56 and 57 and bottom brace 52. As best shown in FIG. 13, tabs 56 and 57 cooperate with bottom brace 52 to securely maintain sled assembly 40 on guide rails 208 and 209 while at the same time allowing sled assembly 40 to slide along guide rails 208 and 209 toward roadside hazard 310. Tabs 56 and 57 are particularly helpful in preventing undesired lateral rotation of sled assembly 40 in response to a side impact.

Most impacts between a motor vehicle and end 41 of sled assembly 40 will generally occur at a location substantially above energy absorbing assemblies 186. As a result, vehicle impact with end 41 will generally result in applying a rotational moment to sled assembly 40 which forces bottom brace 52 to bear down on the top of guide rails 208 and 209.

The dimensions of plate 55 and guides 58 and 59 are selected to be compatible with web 192 of channels 190. During a collision between a motor vehicle and end 41 of sled assembly 40, force from the vehicle is transferred from top brace 141 through channels 50 and 53 to bottom brace 52 and guide assembly 54. As a result, plate 55 will apply force to supporting beams 190b to maintain the desired orientation of sled assembly 40 relative to energy absorbing assemblies 186.

The inertia of sled assembly 40 and the friction associated with bottom brace 52 sliding over the top of guide rails 208 and 209 and the friction caused by contact between plate 55 and the top of supporting beams 190b will contribute to deceleration of the impacting vehicle.

Figure 12:
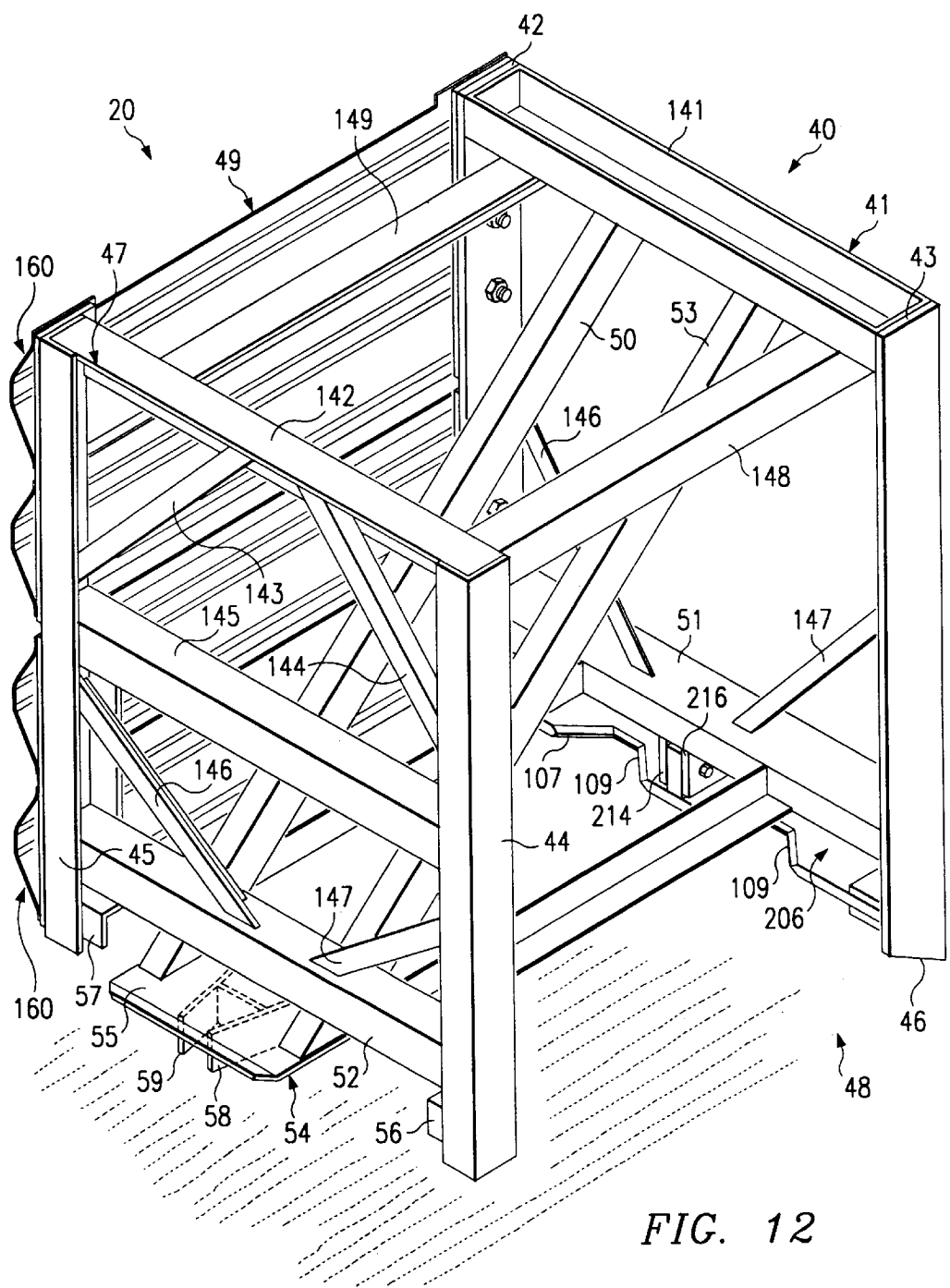
FIG. 12 is a schematic drawing with portions broken away showing an isometric view of the sled assembly associated with the energy absorbing system of FIG. 10.

For the embodiment of the present invention as best shown in FIGS. 11, 12 and 14 connectors 214 and 216 are attached to bottom brace 51 opposite from cross braces 145 and 146. Connectors 214 and 216 are spaced laterally from each other to receive connector 220 which is attached to and extends from cutter plate 206. Connectors 222 and 224 are also preferably attached to corner post 42 and extend laterally therefrom. Corresponding connectors 222 and 224 are also attached to corner post 43 and extend laterally therefrom. Connectors 222 are spaced from respective connectors 224 a distance corresponding generally with the thickness of cutter plate 206. As best shown in FIG. 14, a plurality of holes is provided in connectors 214, 216, 220, 222, 224 and cutter plate 206 to allow mechanical fasteners to securely attach cutter plate 206 with sled assembly 40 adjacent to energy absorbing assemblies 186.

As best shown in FIGS. 12, 14 and 20 cutter plate 206 preferably includes two sets of beveled cutting edges or ripping edges 107 and 109. Sled assembly 40 is slidably disposed on guide rails 208 and 209 with cutting edges 107 and 109 aligned with first end 187 of energy absorbing assemblies 186. The thickness of cutter plate 206 and the gap or cutting zone 154 between supporting beams 190a and 190b are selected to allow cutter plate 206 to fit between flanges 194 and 196 of supporting beams 190a and 190b. Cutter plate 206 is located within slots 102 of energy absorbing assemblies 186.

As best shown in FIG. 14, cutter plate 206 preferably includes respective guide plates 268. A respective guide plate 268 is provided on each side of cutter plate 206 for each supporting beam 190. The width of each guide plate 268 is selected to be compatible with the width of the respective supporting beam 190. The combined thickness of each cutter plate 206 along with respective guide plates 268 is selected to be compatible with gap or cutting zone 154 formed between respective support beams 190. The thickness of cutting plate 206 is selected to correspond generally with the dimensions of gap 154. Each guide plate 268 is preferably disposed within the generally C-shaped cross section defined by web 192 and flanges 194 and 196 of the associated support beams 190. For some applications, gap or cutting zone 154 between supporting beams 190a and 190b may be approximately one inch (or twenty-five millimeters) and the thickness of cutter plates 206 may be approximately one half inch.

During a collision with end 21 of energy absorbing system 20, a vehicle will experience a deceleration spike as momentum is transferred from the vehicle to sled assembly 40 which results in sled assembly 40 and the vehicle moving in unison with each other. The amount of deceleration due to the momentum transfer is a function of the weight of sled assembly 40, along with the weight and initial speed of the vehicle. As sled assembly 40 slides longitudinally toward roadside hazard 310, guide assembly 54 will contact respective supporting beams 190b to maintain the desired alignment between sled assembly 40 and energy absorbing assemblies 186 and cutter plates 206. Sled assembly 40 maintains cutter blade 206 in alignment with cutting zone 154.

As sled assembly 40 continues sliding toward roadside hazard 310, cutter plate 206 will engage and separate energy absorbing elements 152 of the respective energy absorbing assemblies 186. When sled assembly 40 is impacted by a vehicle, cutter plate 206 is pushed into the edge of each energy absorbing element 152. Beveled edges 107 and 109 of cutter plate 206 engage the respective energy absorbing elements 152. Cutter plate 206 may be formed from various steel alloys. Beveled edges 107 and 109 are preferably hardened to provide desired cutting and/or ripping of energy absorbing elements 152.

The center portion of each energy absorbing element 152 is forced inwardly between respective supporting beams 190, while the top and bottom portions of each energy absorbing element 152 are fixed to respective supporting beams 190 by bolts 198a and 198b. The center portion of each energy absorbing element 152 continues to be stretched or deformed by cutter plate 206 until the respective energy absorbing element 152 typically fails in tension. This creates a separation in each energy absorbing element 152 which propagates along the length of respective energy absorbing elements 152 as sled assembly 40 continues to be push cutter plate 206 therethrough.

The separation of energy absorbing elements 152 will stop when kinetic energy from the impacting vehicle has been absorbed. After the passage of cutter plate 206, one or more energy absorbing elements 152 will be separated into upper and lower parts (See FIG. 5), which upper and lower parts are separated by a gap.

Cutter plate 206, when viewed from associated energy absorbing elements 152, has the configuration of a deep, strong beam. Cutter plate 206 is secured to sled assembly 40 at both ends and in the center and is therefore rigid. Thus, when cutter plate 206 engages energy absorbing elements 152, the energy absorbing elements 152 fails while cutter plate 206 does not.

As previously noted, the thickness and number of energy absorbing elements 152 may be varied to safely absorb the kinetic energy from a wide range of vehicle types, sizes and/or speeds of impact. The rotational moment which is generally applied to end 41 of sled assembly 40 will also increase frictional forces between cutter plate 206 and portions of energy absorbing element 152 which have been sheared or ripped.

For the embodiment as shown in FIG. 9A, end 47 of sled assembly 40 will contact panel support frame 60a which will, in turn, contact panel support frame 60b and any other panel support frames disposed downstream from sled assembly 40. Movement of sled assembly 40 toward roadside hazard 310 results in telescoping of panel support frames and their associated panels 160 with respect to each other. The inertia of panel support frames and their associated panels 160 will further decelerate an impacting vehicle as sled assembly 40 moves longitudinally from first end 21 toward second end 22 of energy absorbing system 20. The telescoping or sliding of panels 160 against one another produces additional friction forces which also contribute to deceleration of the vehicle. Movement of panel support frames along guide rails 208 and 209 also produces additional frictional forces to even further decelerate the vehicle.

As previously discussed with respect to FIGS. 9A and 9B, panel support frames 60a–60e and associated panels 160 will redirect vehicles striking either side of energy absorbing system 20 back onto the associated roadway. Each panel 160 preferably has a generally elongated rectangular configuration defined in part by first end or upstream end 161 and second end or downstream end 162. (See FIGS. 9A, 10 and 17.) Each panel 160 preferably includes first edge 181 and second edge 182 which extend longitudinally between first end 161 and second end 162. (See FIGS. 10, 17 and 18.) For some applications panels 160 may be formed from standard ten (10) gauge W beam guardrail sections having a length of approximately thirty-four and three-fourth inches for "one-bay panels" and five feet two inches for "two-bay panels." Each panel 160 preferably has approximately the same width of twelve and one-fourth inches.

As shown in FIGS. 16 and 17, slot 164 is preferably formed in each panel 160 intermediate ends 161 and 162. Slot 164 is preferably aligned with and extends along the longitudinal center line (not expressly shown) of each panel 160. The length of slot 164 is less than the length of the associated panel 160. A respective slot plate 170 is slidably disposed in each slot 164.

Metal strap 166 is preferably welded to first end 161 of each panel 160 along edges 181 and 182 and the middle. For some applications metal strap 166 may have a length of approximately twelve and one-fourth inches and a width of approximately two and one-half inches. The length of each metal strap 166 is preferable equal to the width of the respective panel 160 extends between respective longitudinal edges 181 and 182.

Mechanical fasteners 167, 168, and 169 may be used to attach each metal strap 166 with its associated corner post 68 or 69. Mechanical fasteners 167 and 169 are substantially identical. Metal straps 166 provide more contact points for mounting end 161 of panels 160 to respective panel support frames 60a–60f.

Recesses 184 are preferably formed in each panel 160 at the junction between second end 162 and respective longitudinal edges 181 and 182. (See FIG. 17) Recesses 184 allow panels 160 to fit with each other in a tight overlapping arrangement when energy absorbing system 20 is in its first position. As a result, recesses 184 minimize the possibility of a vehicle snagging the sides of energy absorbing system 20 during a "reverse angle" collision or impact.

Panel support frames 60a–60e have substantially the same dimensions and configuration. Therefore, only panel support frame 60e as shown in FIG. 16 will be described in detail. Panel support frame 60e has a generally rectangular configuration defined in part by first post 68 disposed adjacent to guide rail 208 and second post 69 disposed adjacent to guide rail 209. Top brace 61 extends laterally between first post 68 and second post 69. Bottom brace 62 extends laterally between first post 68 and second post 69. The length of posts 68 and 69 and the location of bottom brace 62 are selected such that when panel support frame 60e is disposed on guide rails 208 and 209, bottom brace 62 will contact guide rails 208 and 209 but posts 68 and 69 will not contact concrete foundation 308.

A plurality of cross braces 63, 64, 65, 70 and 71 may be disposed between posts 68 and 69, top brace 61 and bottom brace 62 to provide a rigid structure. For some applications cross braces 63, 64, 65, 70 and 71 and/or posts 68 and 69 may be formed from relatively heavy structural steel components. Also, cross brace 65 may be installed at a lower position on posts 68 and 69. The weight of support frames 60a–60e and the location of the associated cross braces to provide desired strength during a side impact with energy absorbing system 20.

Tab 66 (See FIG. 15) is attached to the end of post 69 adjacent to concrete foundation 308 and extends laterally toward energy absorbing assemblies 186. Tab 67 is attached to the end of post 68 adjacent to concrete foundation 308 and extends laterally toward energy absorbing assemblies 186. Tabs 66 and 67 cooperate with bottom brace 62 to maintain panel supporting frame 60e engaged with guide rails 208 and 209 during a side impact with energy absorbing system 20 to prevent or minimize rotation in a direction perpendicular to guide rails 208 and 209 while allowing panel supporting frame 60e to slide longitudinally toward roadside hazard 310.

Impact from a vehicle colliding with either side of energy absorbing assembly 20 will be transferred from panels 160 to panel support frames 60a–60g. The force of the lateral impact will then be transferred from panel support frames 60a–60g to the associated guide rails 208 and/or 209 to energy absorbing assemblies 186 through cross ties 24 and mechanical fasteners 26 to concrete foundation 308. Cross ties 24, mechanical fasteners 26, energy absorbing assemblies 186, guide rails 208 and 209 along with panel support frames 60a–60g provides lateral support during a side impact with energy absorbing system 20.

For purposes of explanation, panels 160 shown in FIGS. 17 and 18 have been designated 160a, 160b, 160c, 160d, 160e and 160f. Further, the longitudinal edges of panels 160a–160d are identified as longitudinal edges 181a–181d and 182a–182d, and the longitudinal edges of panel 160f are identified as longitudinal edges 181f and 182f. Also, for panels 160a, 160b, and 160d, ends 161 and 162 are identified as ends 161a and 162a, ends 161b and 162b, and ends 161d and 162d, respectively. Likewise, for panel 160c, the upstream end is identified as end 161c; and for panel 160e, the downstream end is identified as end 162e. For the embodiment of the present invention, as shown in FIG. 17, respective metal straps 166 are provided to attach first end 161a and first end 161d to post 68 of panel support frame 60c. In a similar manner, respective metal straps 166 are provided to securely attach first end 161b and 161e to corner post 68 of panel support frame 60d. As best shown in FIG. 18, bolt 168 extends through hole 172 in respective slot plate 170 and a corresponding hole (not expressly shown) in panel 160b.

As best shown in FIG. 19, slot plate 170 preferably includes hole 172 extending therethrough. A pair of fingers 174 and 176 extend laterally from one side of slot plate 170. Fingers 174 and 176 are sized to be received within slot 164 of the associated panel 160. Mechanical fastener 168 is preferably longer than mechanical fasteners 167 and 169 to accommodate slot plate 170. Each slot plate 170 and bolt 168 cooperate with each other to securely anchor end 161 of an inner panel 160 with the associate post 68 or 69 while allowing an outer panel 160 to slide longitudinally relative to the associated post 68 or 69. See inner panel 160b and outer panel 160a in FIG. 18.

For the embodiment of the present invention as shown in FIGS. 17 and 18, a portion of bolt 168 along with associated fingers 174 and 176 of slot plate 170 are slidably disposed in longitudinal slot 164 of panel 160b. During a vehicle impact with end 21 of energy absorbing assembly 20, panel support frame 60c with first end 161a of panel 160a will move longitudinally toward roadside hazard 310. The engagement of the associated slot plate 170 within longitudinal slot 164 will allow panel 160a to slide longitudinally relative to panel 160b until panel support frame 60c contacts panel support frame 60d. When this contact occurs, panel support frame 60d and associated panels 160 will move with panel support frame 60c and its associated panels 160 toward roadside hazard 160.

Upon a vehicle impact with the sled assembly 40, sled assembly 40 is pushed into the frames which are maintained in vertical alignment by guide rails 208 and 209, bottom brace 62 and tabs 66 and 67 as the frames slide toward roadside hazard 310.

As previously discussed each panel support frame 60a–60e is slidably disposed on guide rails 208 and 209. As best shown in FIG. 17, upstream panel 160b overlaps downstream panel 161c. End 161c of downstream panel 160c is preferably welded to strap 166. Slot plate 170 is slidably disposed in slot 164 of upstream panel of 160b. Therefore, as panel support frame 60d moves longitudinally toward panel support frame 60e, panel 160b may slide longitudinally and telescope over downstream panel 160c.

For many applications, energy absorbing elements disposed immediately adjacently to sled assembly 40 will typically be relatively thin or "soft" to decelerate relatively small, slow-moving vehicles. The length of energy absorbing system 20 is preferably selected to be long enough to provide for multiple stages for satisfactory deceleration of large, high-speed vehicles after sled assembly 40 has moved through the front portion with "relatively soft" energy absorbing elements. Generally, energy absorbing elements installed in the middle portion of energy absorbing system 20 and immediately adjacent to roadside hazard 310 will be relatively "hard" as compared to energy absorbing elements installed adjacent to first end 21.

When a vehicle initially impacts end 21 of energy absorbing system 20, any occupants who are not wearing a seat belt or other restraining device will be catapulted forward from their seat. Properly restrained occupants will generally decelerate with the vehicle. During the short time period and distance sled assembly 40 travels along guide rails 208 and 209, an unrestrained occupant may be airborne inside the vehicle. Deceleration forces applied to the impacting vehicle during this same time period may be quite large. However, just prior to an unrestrained occupant contacting interior portions of the vehicle, such as the windshield (not expressly shown), deceleration forces applied to the vehicle will preferably be reduced to lower levels to minimize possible injury to the unrestrained occupant.

The relative "softness" or "hardness" of energy absorbing system 20 is determined by the number and characteristics of energy absorbing elements 152, the location of energy absorbing elements 152, and the location and inertia associated with panel support frames 60a–60g and their associated panels 160. For example, energy absorbing element 200 shown in FIG. 8 may be modified to be relatively hard by reducing the number and/or size of oval slot 204. In the same manner, energy absorbing element 200 may be made relatively soft by increasing the number and/or size of oval slot 204. Increasing the thickness of energy absorbing elements 152 will increase the amount of force required to push cutter plate 206 therethrough and thus, produces a harder portion in the associated energy absorbing system 20. Energy absorbing assembly 486 as previously described in FIG. 7 shows various techniques for increasing the hardness of an energy absorbing system. Thus, the present invention allows modifying energy absorbing system 20 to minimize possible injury to both restrained and unrestrained occupants in a wide variety of vehicles traveling at various speeds.

Energy absorbing system 20 as shown in FIG. 20 preferably includes energy absorbing elements 152a, 152b, 152c, 152d, 152e and 152f. Energy absorbing elements 152a and 152b are preferably formed from relatively thin sixteen gauge construction steel strips having a nominal width of four and one half inches. Energy absorbing element 152a preferably has a nominal length of approximately fifty-four inches. Energy absorbing element 152b preferably has a nominal length of approximately sixty inches. Energy absorbing elements 152c and 152d are preferably formed from structural steel strips having a nominal width of four and one half inches and thickness of three-sixteenths of an inch. Energy absorbing element 152c preferably has a nominal length of approximately seventy-six inches. Energy absorbing element 152d preferably has a nominal length of approximately seventy inches. Energy absorbing elements 152e are preferably formed from the same type of material. Energy absorbing elements 152f are preferably formed from structural steel strips having a width of approximately four and one-half inches and a length of approximately ninety-two inches. Each energy absorbing element 152f preferably has a thickness corresponding with ten gauge construction steel strips.

By combining energy absorbing elements 152a, 152b, 152c, 152d, 152e and 152f, as shown in FIG. 20, energy absorbing assemblies 186 will have a relatively "soft" first portion, a "hard" middle portion and a "harder" final portion adjacent to roadside hazard 310. Energy absorbing elements 152a, 152b, 152c, 152d, 152e and 152f are staggered to decrease the change in deceleration forces applied to an impacting vehicle as cutter blade 206 passes from the first portion of energy absorbing assembly 220 to the middle portion of energy absorbing system 20.

When sled assembly 40 hits thicker energy absorbing media, such as the previously described energy absorbing elements, sled assembly 40 slows down while the panel support frames continue to slide toward fixed hazard 310, telescoping panels 160 along the way. Thus, the panel support frames will typically move out of the way so that they no longer contribute to deceleration of the vehicle.

If the sled assembly 40 is hit at an angle, energy absorbing system 20 will generally function as previously described to decelerate the impacting vehicle. Depending upon the angle of impact with sled assembly 40, additional deceleration may occur due to increased friction forces being applied to sled assembly 40 as it slides along guide rails 208 and 209.

If panels 160 are hit, the vehicle is redirected back to the roadway and away from the fixed hazard. The impact is transmitted from the panels 160 to respective panel support frames. The panel support frames attempt to rotate, as panels 160 are usually hit high. However, the panel support frames are prevented from rotating on guide rails 208 and 209 by inwardly extending projections 56 and 57 underneath beam guides on the rails. Thus, the system "gives" when hit on its side by allowing the cross-ties to deform. Much like the system's collapse during a head on collision, this "give" on a lateral impact reduces deceleration forces applied to a side impacting vehicle. The system remains in place after a lateral redirecting impact.

End weldment 242 is preferably provided at end 22 of energy absorbing system 20 for use in attaching energy absorbing system 20 with the end of roadside hazard 310 facing oncoming traffic. For some applications end weldment 242 has substantially the same configuration as panel supporting frames 60a–60g.

Although the present invention has been described in detail, it should be understood that various changes, substitutions and alterations can be made hereto without departing from the spirit and scope of the invention as defined by the appended claims.

What is claimed is:

1. An energy absorbing system to minimize the results of a collision between a moving vehicle and a roadside hazard comprising:

a pair of guide rails having a first end and a second end with the second end of each guide rail disposed adjacent to the roadside hazard;

the guide rails extending longitudinally from the roadside hazard with the first end of each guide rail facing oncoming traffic;

the guide rails spaced laterally from each other;

a plurality of panel support frames slidably secured to the guide rails;

a plurality of panels having a first end and a second end;

the first end of each panel securely attached to one of the panel support frames;

each panel slidably secured with at least one other panel support frame located downstream from the one panel support frame;

the energy absorbing system having a first position with each panel support frame spaced longitudinally from adjacent panel support frames;

the panel support frames and the respective panels forming a series of bays extending longitudinally from the first end to the second end of the guide rails;

a plurality of two-bay panels defined in part by selected panels having their respective first end securely attached to a first panel support frame and each panel of the two-bay panels slidably attached with two panel support frames disposed downstream from the first panel support frame; and at least one one-bay panel defined by a second panel support frame with the first end of selected panels securely attached thereto and each panel of the one-bay panel slidably attached to only one panel support frame disposed downstream from the second panel support frame.

2. The energy absorbing system of claim 1 further comprising two panels attached to each panel support frame.

3. The energy absorbing system of claim 1 further comprising:
the energy absorbing system having a first end and a second end corresponding generally with the first end and the second end of the pair of guide rails;
the energy absorbing system having a first side and a second side extending longitudinally between the first end and the second end; and
a plurality of panels attached to each side of the energy absorbing system.

4. The energy absorbing system of claim 1 further comprising:
each panel support frame having a generally rectangular configuration; and
a plurality of panels attached to each side of the panel support frames and extending longitudinally from the first end to the second end of the guide rails.

5. The energy absorbing system of claim 1 further comprising the plurality of bays extending between the first end and the second end of the guide rails arranged in the order of a two-bay panel, a two-bay panel, a one-bay panel, a two-bay panel, and a two-bay panel.

6. The energy absorbing system of claim 1 further comprising:
at least one of the panel support frames having a first side and a second side; and
two panels attached to the first side and two other panels attached to the second side.

7. A crash cushion to minimize the results of a collision between a vehicle and a fixed obstacle, comprising:
a failure medium extending in a first direction and having first and second ends;
a nose located at the first end and being movable in the first direction when impacted, the nose comprising a cutter that moves through the failure medium when the nose is moved in the first direction;
a group of panels extending from the first end to the second end, the panels being structured and arranged to be located above ground so as to make contact with an impacting vehicle after the crash cushion is installed; and
a framework located between the nose and the second end, the framework supporting the panels, the framework being collapsible toward the second end when the nose is impacted, the framework resisting collapse in the first direction when the panels are impacted in a second direction that is perpendicular to the first direction.

8. The crash cushion of claim 7 further comprising:
two parallel, spaced apart tracks extending between the first and second ends; and
the framework comprising plural frames mounted on the tracks.

9. The crash cushion of claim 7 wherein:
each panel has an upstream end and a downstream end, with the upstream end being nearest to the first end and the downstream end being nearest to the second end; and
the upstream end of each panel being fixedly coupled to the framework, the downstream end of each panel being slidably coupled to the framework.

10. The crash cushion of claim 9 wherein:
each panel comprises a slot that extends from a location near the upstream end to a location that is near the downstream end;
the panels are arranged so as to be coupled to the framework in an overlapping manner, the overlapping panels comprising the upstream end of one panel and the downstream end of another panel, with the upstream end of the one panel being fixedly coupled to the framework by a fastener; and
the fastener comprising a standoff that is received by the slot near the downstream end of the other panel.

11. An energy absorbing system to minimize the results of a collision between a moving vehicle and a roadside hazard comprising:
a pair of guide rails having a first end and a second end, the guide rails spaced laterally from each other and extending longitudinally from the roadside hazard in a first direction with the first end of each guide rail facing oncoming traffic and the second end of each guide rail disposed adjacent to the roadside hazard;
a failure medium having first and second ends, the failure medium extending in the first direction;
a nose located near the first ends of the guide rails and being movable in the first direction when impacted;
the nose including a cutter that moves through the failure medium when the nose is moved in the first direction, the cutter having a generally rectangular configuration defined in part by a pair of lateral edges and a pair of longitudinal edges;
a first set of cutting edges formed in a first lateral edge of the cutter;
a second set of cutting edges formed in the first lateral edge of the cutter and spaced apart from the first set of cutting edges;
a framework located between the nose and the second ends of the guide rails, the framework including a plurality of panel support frames slidably secured to the guide rails, the framework being collapsible toward the second end when the nose is impacted and resisting collapse when the panels are impacted in a second direction that is perpendicular to the first direction;
a plurality of panels each having a first end and a second end, the first end of each panel securely attached to one of the panel support frames, and each panel slidably secured with at least one other panel support frame located downstream from the one panel support frame;
the plurality of panels extending substantially from the nose to the second end of the guide rails, the panels being located above ground so as to make contact with an impacting vehicle;
at least first and second panels among the plurality of panels having a generally rectangular configuration with a first end, a second end, and a longitudinal axis extending from the first end to the second end, the first and second panels each having a first edge and a second edge extending longitudinally between the first end and the second end and a generally W-shaped cross section extending laterally with respect to the longitudinal axis;
a first strap welded to the first end of the first panel and a second strap welded to the first end of the second panel; and
recesses formed in the first and second edges of the first panel adjacent to the second end of the first panel, the recesses being configured to accommodate the first end of the second panel.

* * * * *